United States Patent
Toda

(10) Patent No.: US 8,374,464 B2
(45) Date of Patent: Feb. 12, 2013

(54) METHOD, APPARATUS AND PROGRAM FOR ENHANCEMENT OF IMAGE RESOLUTION

(75) Inventor: Masato Toda, Tokyo (JP)

(73) Assignee: NEC Corporation, Tokyo (JP)

( * ) Notice: Subject to any disclaimer, the term of this patent is extended or adjusted under 35 U.S.C. 154(b) by 891 days.

(21) Appl. No.: 12/303,103

(22) PCT Filed: May 31, 2007

(86) PCT No.: PCT/JP2007/061057
§ 371 (c)(1),
(2), (4) Date: Dec. 1, 2008

(87) PCT Pub. No.: WO2007/142109
PCT Pub. Date: Dec. 13, 2007

(65) Prior Publication Data
US 2009/0129704 A1 May 21, 2009

(30) Foreign Application Priority Data

May 31, 2006 (JP) ................................. 2006-151900

(51) Int. Cl.
*G06K 9/32* (2006.01)
(52) U.S. Cl. .................................... 382/299; 382/284
(58) Field of Classification Search .................. 345/606; 348/207.1, 207.2, 441; 375/240.16, 240.25; 382/236, 254, 284, 299
See application file for complete search history.

(56) References Cited

U.S. PATENT DOCUMENTS

| | | | | |
|---|---|---|---|---|
| 6,594,313 B1 * | 7/2003 | Hazra et al. | ............... | 375/240.16 |
| 7,085,323 B2 * | 8/2006 | Hong | ........................ | 375/240.25 |
| 7,483,051 B2 * | 1/2009 | Aiso | .......................... | 348/207.2 |

(Continued)

FOREIGN PATENT DOCUMENTS

| | | |
|---|---|---|
| JP | 2004-272895 A | 9/2004 |
| JP | 2005-129996 A | 5/2005 |

(Continued)

OTHER PUBLICATIONS

Matsuzaka, K., et al., "Image processing apparatus and recommendation degree displaying method," machine translation of Japanese application 2006-020317, Jan. 2006.*

(Continued)

*Primary Examiner* — Vu Le
*Assistant Examiner* — Xuemei Chen
(74) *Attorney, Agent, or Firm* — Scully, Scott, Murphy & Presser, P.C.

(57) ABSTRACT

In super-resolution processing in which a plurality of low resolution images are synthesized to generate a high resolution image, a high-quality high-resolution image is to be generated with suppression of the noise ascribable to motion estimation error. Motion estimating means 11 estimates motion of pixels between a basis image selected out of plural low resolution images and remaining reference images, and outputs a result of motion estimation. Motion estimation reliability evaluating means 12 evaluates reliability of the result of motion estimation output from the motion estimating means 11, based on such as analogy in luminance of pixels, correlated by the results of the motion estimation, and outputs a motion estimation reliability value indicating the degree of reliability. High resolution image estimating means 16 synthesizes the respective pixels of the input low resolution images with weighting conforming to the motion estimation reliability value output from the motion estimation reliability evaluating means 12 to generate a high resolution image.

20 Claims, 22 Drawing Sheets

U.S. PATENT DOCUMENTS

| | | | |
|---|---|---|---|
| 7,613,363 B2 * | 11/2009 | Platt et al. | 382/299 |
| 7,672,538 B2 * | 3/2010 | Aiso | 382/284 |
| 7,702,184 B2 * | 4/2010 | Aiso | 382/299 |
| 7,738,731 B2 * | 6/2010 | Aiso | 382/284 |
| 7,940,282 B2 * | 5/2011 | Milanfar et al. | 345/606 |
| 2004/0156561 A1 | 8/2004 | Yu-Chuan et al. | |
| 2004/0196376 A1 * | 10/2004 | Hosoda et al. | 348/207.1 |
| 2004/0218828 A1 * | 11/2004 | Aiso | 382/254 |
| 2005/0008255 A1 * | 1/2005 | Aiso | 382/284 |
| 2005/0157949 A1 * | 7/2005 | Aiso et al. | 382/299 |
| 2006/0012830 A1 | 1/2006 | Aiso | |
| 2009/0161010 A1 * | 6/2009 | Tran et al. | 348/441 |
| 2009/0263033 A1 * | 10/2009 | Weston | 382/236 |
| 2011/0134315 A1 * | 6/2011 | Levy et al. | 348/441 |

FOREIGN PATENT DOCUMENTS

| | | |
|---|---|---|
| JP | P2006-20137 A | 1/2006 |
| JP | 2006-33062 A | 2/2006 |

OTHER PUBLICATIONS

Wee, S. J., "Reversing motion vector fields," IEEE International Conference on Image Processing, Oct. 1998.*

Official Action dated May 31, 2011 received from the Japanese Patent Office from related Japanese Application No. 2008-520521, together with a partial English-language translation.

Park et al., "Super-Resolution Image Reconstruction: A Technical Overview", IEEE Signal Processing Magazine, vol. 20, No. 3, pp. 21-36, May 2003.

* cited by examiner

FIG.5

| S | q |
|---|---|
| 0 | 1 |
| 1 | 1 |
| 2 | 0.99 |
| 3 | 0.98 |
| ⋮ | ⋮ |
| 254 | 0.01 |
| 255 | 0 |

METHOD, APPARATUS AND PROGRAM FOR ENHANCEMENT OF IMAGE RESOLUTION

The present application claims the priority right based on the Japanese Patent Application 2006-151900, filed in Japan on May 31, 2006. The entire disclosure of this patent application of the earlier filing date is to be incorporated herein by reference thereto.

The present invention relates to an image resolution enhancement technique for generating a high resolution image from a plurality of low resolution images. More particularly, it relates to a technique in which noise (artifacts) otherwise made apparent on a generated high resolution image by a motion estimation error may be reduced to generate an image which may appear to be a high quality image to a viewer.

BACKGROUND ART

There has so far been proposed a method for image resolution enhancement in which a plurality of low resolution images, obtained by capturing the same scene, and presenting positional shifts, are synthesized to generate a high resolution image.

FIG. 21 shows an example of the formulation of a conventional apparatus for image resolution enhancement in which a plurality of low resolution images are synthesized to generate a high resolution image. The conventional apparatus for image resolution enhancement includes a motion estimating means 71 and a high resolution image estimating means 72. The motion estimating means 71 receives a plurality of low resolution images as input, and estimates the motion (i.e. positional shift) of each pixel of a basis image with respect to the reference images to output the results estimated. The basis image is one of the input low resolution images, and is an image the resolution of which is to be enhanced. In the apparatus for image resolution enhancement, positional shifts (displacements) between the low resolution images need to be detected with accuracy higher than pixel-based accuracy, that is, with a sub-pixel accuracy.

The techniques for motion estimation may be classified into an area based technique and a feature based technique. As a commonplace area based technique there is a block matching method. The block matching method initially enlarges a low resolution image to a resolution with which the degree of the accuracy needed may be achieved. A movement vector is then found by block matching processing. With the processing of the block matching, a movement vector (ux, uy) of pixel accuracy, which will minimize a value $\epsilon$ of a difference evaluation function of a pixel value of a template block of a given size for a pixel of interest (i,j) in an image I1 and a pixel value of a given block in a reference image I2 is found. An example of the method to find $\epsilon$ is shown in the equations (1) and (2), in which $I_1(i,j)$ denotes a pixel value at a coordinate (i,j) of the image $I_1$, and $I_2(i,j)$ denotes a pixel value at a coordinate (i,j) of the image $I_2$, provided that BL denotes a block size.

$$\varepsilon(ux, uy) = \sum_{m=-BL/2}^{BL/2} \sum_{n=-BL/2}^{BL/2} \left| I_1(i+m, j+n) - I_2\binom{i+m+ux,}{j+n+uy} \right| \quad (1)$$

$$\varepsilon(ux, uy) = \sum_{m=-BL/2}^{BL/2} \sum_{n=-BL/2}^{BL/2} \left( \begin{array}{c} I_1(i+m, j+n) - \\ I_2(i+m+ux, j+n+uy) \end{array} \right)^2 \quad (2)$$

The high resolution image estimating means 72 receives the low resolution images and the results of motion estimation, as inputs, and estimates a high resolution image from the so received information to output a so estimated high resolution image. The high resolution image estimating means 72 may be exemplified by a technique that outputs x, which will minimize an evaluation function of the maximum probability (likelihood) estimation represented by equation (3) or the maximum a-posteriori probability (MAP) estimation represented by equation (4), as being a result of estimation (see Non-Patent Document 1, for example). It should be noted that, in these equations, x denotes a high resolution image and y denotes a low resolution image. Also, A denotes an image transformation matrix, including the motions between the images, down-sampling and so forth, C a high-pass filter and $\lambda$ a constant. The motions between the images, included in the image transformation matrix A, reflect the movement vector calculated using the aforementioned equations (1) and (2).

$$g_1(x) = \sum_{\forall n} \|y_n - A_n x\|^2 \quad (3)$$

$$g_2(x) = \sum_{\forall n} \|y_n - A_n x\|^2 + \lambda \|C(x)\|^2 \quad (4)$$

The technique for image resolution enhancement, consisting in synthesizing the multiple low resolution images to yield a high resolution image, is generally termed super-resolution processing. In the super-resolution processing, including motion estimation processing, it is necessary to carry out motion estimation with sub-pixel accuracy, as described above. It is however difficult to estimate the motion with the sub-pixel accuracy based on the pixel-based low resolution images, and hence the result of estimation errors is unavoidably corrupted with errors. In most cases, these errors account for noisse (or artifacts) in the generated high resolution image.

However, these errors in the motion estimation are not taken into account in the conventional technique that generates a high resolution image using the aforementioned equations (3) and (4) as described in Non-Patent Document 1. The conventional technique, disclosed in Non-Patent Document 1, thus suffers a problem that noises are produced in the high resolution image generated because the technique is based on the premise that the results of motion estimation are free of errors.

On the other hand, the technique as now described has so far been proposed as a technique that may improve the image quality of the high resolution image generated by super-resolution processing (see Patent Document 1).

In Patent Document 1, weighting for each pixel of each low resolution image is determined based on a motion estimation vector between a basis image and each reference image, the temporal distance between the basis image and each reference image, such as difference in the frame numbers, and on the distance between a pixel in a high resolution image being generated (a pixel being generated) and a pixel in each low resolution image nearest to the pixel being generated (pixel-to-pixel distance). The respective pixels of the respective low resolution images are synthesized as the weighting is taken into account to generate a high resolution image.

FIG. 22 depicts a block diagram showing an example of the formulation of the apparatus for image resolution enhancement described in Patent Document 1. This apparatus for image resolution enhancement includes a motion estimating means 91, a motion distance evaluating means 92, a motion estimation evaluating means 93, a weight generating means 94 and a high resolution image estimating means 95.

The motion estimating means 91 receives a plurality of low resolution images as input to output the results of estimation of the motion between the low resolution images (motion estimation vectors). The motion distance evaluating means 92 receives the motion estimation vectors as inputs to evaluate the magnitudes of the motion estimation vectors, the temporal distance between images and the pixel-to-pixel distances. More specifically, the estimation by the motion distance evaluating means 92 is such that, the larger the values of the motion estimation vectors, the temporal distance between images and the pixel-to-pixel distances, the more likely it is that the image is deteriorated in quality.

The motion estimation evaluating means 93 integrates the above three evaluations from the motion distance evaluating means 92. The weight generating means 94 decides on the weights on the respective pixels of the respective low resolution images, and synthesizes respective low resolution images, by using the weighting, as determined by the weight generating means 94, to output a high resolution image.

Patent Document 1: JP Patent Kokai JP-A-2006-033062

Non-Patent Document 1: S. C. Park, M. K. Park and M. G. Kang, "Super-Resolution Image Reconstruction: A Technical Overview", IEEE Signal Processing Magazine, vol. 20, no. 3, pp. 21-36, May 2003

DISCLOSURE OF THE INVENTION

Problem to be Solved by the Invention

The following analysis has been made from the perspective of the present invention.

Meanwhile, the entire disclosures of the above-listed Patent Document 1 and the Non-Patent Document 1 are to be incorporated herein by reference thereto.

With the related art technique, disclosed in the aforementioned Patent Document 1, the weights used in synthesizing the pixels of the respective low resolution images are determined on the basis of the magnitudes of the motion estimation vectors, temporal distance and the pixel-to-pixel distances, and the low resolution images are synthesized in accordance with the so determined weights. It is thereby possible to improve the image quality of the high resolution image as compared to the conventional technique disclosed in the Non-Patent Document 1. However, with the conventional technique, disclosed in Patent Document 1, no evaluation is made of reliability (certainty) of the results of the motion estimation, thus raising a problem that deterioration in the image quality cannot be suppressed sufficiently. That is, with the super-resolution processing, including motion estimation, an error in the motion estimation mainly accounts for the artifactual noise in the high resolution image generated. However, with the conventional technique, disclosed in Patent Document 1, no consideration is given to the error in the motion estimation, with a consequence that deterioration in the image quality cannot be suppressed sufficiently.

It is therefore an object of the present invention to enable a high-quality image to be generated in a state substantially free of the noise ascribable to the motion estimation errors, by evaluating the reliability in the motion estimation (or prediction) and by taking account of the so evaluated reliability in synthesizing the low resolution images.

Means to Solve the Problem

In one aspect, there is provided an apparatus for enhancement of image resolution in which a plurality of low resolution images are synthesized (combined together) to generate a high resolution image, in which the apparatus comprises motion estimating (or predicting) means, a motion estimation reliability evaluating means and a high resolution image estimating means. The motion estimating means estimates motion between pixels of low resolution images to output result of motion estimation, and the motion estimation reliability evaluating means evaluates reliability of the result of the motion estimation as output by the motion estimating means and outputs a motion estimation reliability evaluation value indicating a degree of the reliability. The high resolution image estimating means synthesizes pixels of the low resolution images by using the result of the motion estimation, upon which a synthesizing method is employed which is in conformity with the motion estimation reliability evaluation value as output by the motion estimation reliability evaluating means.

Preferably, the high resolution image estimating means of the apparatus for enhancement of image resolution estimates the high resolution image so that the high resolution image synthesized is affected only weakly or remains unaffected by a pixel(s) of low reliability.

Preferably, the high resolution image estimating means of the apparatus for enhancement of image resolution estimates the high resolution image so that the high resolution image synthesized is affected strongly by a pixel(s) of high reliability.

Also preferably, in synthesizing respective pixels of the low resolution images by using the result(s) of the motion estimation, the high resolution image estimating means synthesizes the pixels to form a high resolution image with weighting values conforming to a motion estimation reliability evaluation value as output from the motion estimation reliability evaluating means.

The motion estimating means of the apparatus for enhancement of image resolution preferably estimates, in a combination of given two of the low resolution images, the motion of a pixel of interest of one of the two low resolution images towards the other low resolution image to output an estimated motion as a first result of estimation, also estimating the motion of a pixel of the other low resolution image corresponding to the pixel of interest towards the one low resolution image to output an estimated motion as a second result of estimation. The motion estimation reliability evaluating means preferably includes a corresponding relationship evaluating means for calculating a motion estimation reliability evaluation value with respect to the first result of estimation based on the relationship of correspondence between the first result of estimation and the second result of estimation.

Preferably, the first result of estimation and the second result of estimation are motion estimation vectors. Also preferably, the corresponding relationship evaluating means calculates the motion estimation reliability evaluation value conforming to a magnitude of a sum vector of a motion estimation vector corresponding to the first result of estimation and a motion estimation vector corresponding to the second result of estimation.

Also preferably, the motion estimation reliability evaluating means of the apparatus for enhancement of image resolution includes analogy degree evaluating means for calculating the motion estimation reliability evaluation value with respect to a motion of a given one of the pixels as estimated by the motion estimating means based on a degree of analogy in luminance between the one pixel and another pixel corresponding to the one pixel.

Also preferably, the apparatus for enhancement of image resolution further includes a motion distance evaluating means for calculating a motion distance evaluation value conforming to the amount of motion of the given one of the pixels as estimated by the motion estimating means. When synthesizing pixels of a plurality of the low resolution images by using the result(s) of motion estimation, the high resolution image estimating means synthesizes the pixels with weighting conforming to the motion estimation reliability evaluation value as output from the motion estimation reliability evaluation means and to the motion distance evaluation value as calculated by the motion distance evaluating means.

Also preferably, the apparatus for enhancement of image resolution further includes a temporal distance evaluating means for calculating a temporal distance evaluating value conforming to a difference between time points of capturing the low resolution images. When synthesizing respective pixels of the multiple low resolution images by using the result(s) of motion estimation, the high resolution image estimating means synthesizes the pixels with weighting conforming to the motion estimation reliability evaluation value as output from the motion estimation reliability evaluating means and to a temporal distance evaluation value as calculated by the temporal distance evaluating means.

In a second aspect, the present invention provides an apparatus for enhancement of image resolution in which a plurality of low resolution images are synthesized to generate a high resolution image, in which the apparatus includes: a motion estimating means, a motion estimation reliability evaluating means, a high resolution image estimating means, a basis image enlarging means and a high resolution image synthesizing means. The motion estimating means selects a basis image out of the multiple low resolution images, and estimates motion of pixel(s) of the selected basis image and the remaining low resolution images, which are reference images, to output a result(s) of motion estimation. The motion estimation reliability evaluating means evaluates reliability of the result(s) of the motion estimation as output by the motion estimating means and outputs a motion estimation reliability evaluation value indicating a reliability degree. The high resolution image estimating means synthesizes pixels of a plurality of low resolution images by using the result(s) of the motion estimation to generate a first high resolution image. The basis image enlarging means enlarges the basis image to generate a second high resolution image of the same size as the first high resolution image. The high resolution image synthesizing means synthesizes respective pixels of the first high resolution image and respective pixels of the second high resolution image with weighting conforming to the motion estimation reliability evaluation value.

In a third aspect, the present invention provides an apparatus for enhancement of image resolution in which a plurality of low resolution images are synthesized to generate a high resolution image, in which the apparatus includes a motion estimating means, a motion estimation reliability evaluating means, a high resolution image estimating means, a basis image enlarging means, and a high resolution image synthesizing means. The motion estimating means selects a basis image out of plurality of low resolution images, and estimates motion of pixel(s) of the selected basis image and the remaining low resolution images, which are reference images, to output a result(s) of motion estimation. The motion estimation reliability evaluating means evaluates the reliability of the result(s) of the motion estimation, as output by the motion estimating means, and outputs a motion estimation reliability evaluation value indicating a reliability degree. The high resolution image estimating means synthesizes pixels of plural low resolution images by using the result(s) of the motion estimation to generate a first high resolution image. When synthesizing the pixels of a plurality of low resolution images by using the result(s) of the motion estimation to generate a first high resolution image, the high resolution image estimating means uses weighting of the respective pixels which is in conforming with the motion estimation reliability evaluation value output from the motion estimation reliability evaluating means. The basis image enlarging means enlarges the basis image to generate a second high resolution image of the same size as the first high resolution image. The high resolution image synthesizing means synthesizes respective pixels of the first high resolution image and respective pixels of the second high resolution image with weighting conforming to the motion estimation reliability evaluation value.

Preferably, the apparatus for enhancement of image resolution further includes a motion distance evaluating means for calculating a motion distance evaluation value conforming to an amount of motion of the pixels estimated by the motion estimating means. Preferably, when synthesizing respective pixels of the first high resolution image and respective pixels of the second high resolution image, the high resolution image synthesizing means synthesizes the pixels with weighting conforming to the motion estimation reliability evaluation value as output from the motion estimation reliability evaluating means and to the motion distance evaluation value as calculated by the motion distance evaluating means.

Preferably, the apparatus for enhancement of image resolution further includes a temporal distance evaluating means for calculating a temporal distance evaluating value conforming to a difference between time points of capturing the low resolution images. Preferably, when synthesizing respective pixels of the first high resolution image and respective pixels of the second high resolution image, the high resolution image synthesizing means synthesizes the pixels with weighting conforming to the motion estimation reliability evaluation value as output from the motion estimation reliability evaluating means and to the temporal distance evaluation value as calculated by the temporal distance evaluating means.

In a fourth aspect, there is provided a method for enhancement of image resolution in which the motion of respective pixels of a plurality of low resolution images is estimated and in which the plurality of low resolution images are synthesized (combined together) to generate a high resolution image based on the reliability of the results of motion estimation.

In a fifth aspect, there is provided a method for enhancement of image resolution in which a plurality of low resolution images are synthesized to generate a high resolution image, in which the method includes a motion estimation step, a motion estimation reliability evaluation step, and a high resolution image estimating step. The motion estimation step estimates a motion between pixels of the low resolution images to output a result(s) of motion estimation. The motion estimation reliability evaluation step evaluates reliability of the result(s) of the motion estimation and outputs a motion estimation reliability evaluation value indicating a reliability degree. The high resolution image estimating step synthesizes the pixels of the low resolution images by using the result(s) of the motion estimation. In synthesizing the respective pixels of the low resolution images by using the result(s) of the motion estimation, the high resolution image estimation step synthesizes the pixels by a synthesizing method which is in conformity with the motion estimation reliability evaluation value.

Preferably, the high resolution image estimating step of the method for enhancement of image resolution estimates the high resolution image so that the high resolution image synthesized is affected only weakly by or remains unaffected by a pixel(s) of low reliability.

Preferably, the method for enhancement of image resolution according to claim 1 wherein the high resolution image estimating step estimates a high resolution image so that the high resolution image synthesized is affected strongly by a pixel of high reliability.

Preferably, when synthesizing the pixels of the plurality of low resolution images by using the result(s) of the motion estimation, the high resolution image estimation step of the method for enhancement of image resolution synthesizes the pixels of the low resolution images with weighting values conforming to the motion estimation reliability evaluation value.

In a sixth aspect, there is provided a method for enhancement of image resolution in which a plurality of low resolution images are synthesized to generate a high resolution image, in which the method includes a motion estimation step, motion estimation reliability evaluation step and a high resolution image estimating step. The motion estimation step estimates a motion between pixels of the low resolution images to output a result of motion estimation. The motion estimation reliability evaluation step evaluates reliability of a result of the motion estimation and outputs a motion estimation reliability evaluation value indicating a reliability degree. The high resolution image estimating step synthesizes pixels of the low resolution images by using the result(s) of the motion estimation. In synthesizing the respective pixels of the low resolution images, the high resolution image estimation step synthesizes the pixels with weighting which is in conformity with the motion estimation reliability evaluation value.

Preferably, the motion estimation step of the method for enhancement of image resolution estimates, in a combination of given two of the low resolution images, a motion of a pixel of interest on one of the two low resolution images towards the other low resolution image is estimated to output an estimated motion as a first result of estimation. The motion estimation step also estimates a motion of a pixel on the other low resolution image corresponding to the pixel of interest towards the one of the two low resolution image to output an estimated motion as a second result of estimation. The motion estimation reliability evaluation step calculates a motion estimation reliability evaluation value with respect to the first result of estimation based on the relationship of correspondence between the first result of estimation and the second result of estimation.

Preferably, the first result of estimation and the second result of estimation are motion estimation vectors. Also preferably, in the motion estimation reliability evaluation step, a motion estimation reliability evaluation value is calculated conforming to a magnitude of a sum vector of the motion estimation vector corresponding to the first result of estimation and a motion estimation vector corresponding to the second result of estimation.

Preferably, in the motion estimation reliability evaluation step of the method for enhancement of image resolution the motion estimation reliability evaluation value with respect to a result as estimated by the motion estimation step is calculated based on degree of analogy in luminance between the one pixel and another pixel corresponding to the one pixel.

Preferably, the method for enhancement of image resolution includes a motion distance evaluating step of calculating a motion distance evaluation value conforming to an amount of motion of the given one of the pixels as estimated by the motion estimation step. When synthesizing pixels of a plurality of the low resolution images by using the result(s) of motion estimation, the pixels are synthesized with weighting conforming to the motion estimation reliability evaluation value and to the motion distance evaluation value.

The method for enhancement of image resolution further includes a temporal distance evaluating step of calculating a temporal distance evaluating value conforming to a difference between time points of capturing the low resolution images. When synthesizing respective pixels of the low resolution images by using the result(s) of motion estimation, the pixels are synthesized with weighting conforming to the motion estimation reliability evaluation value and to the temporal distance evaluation value.

In a seventh aspect, the present invention provides a program for allowing a computer to operate as an apparatus for enhancement of image resolution in which a plurality of low resolution images are synthesized to generate a high resolution image. With the program of the present invention, the computer is allowed for operating as a motion estimating means, a motion estimation reliability evaluating means and as a high resolution image estimating means. The motion estimating means estimates a motion between pixels of low resolution images to output a result(s) of motion estimation. The motion estimation reliability evaluating means evaluates a reliability of the result(s) of the motion estimation, as output by the motion estimating means, and outputs a motion estimation reliability evaluation value indicating a reliability degree. The high resolution image estimating means is caused to synthesize pixels of a plurality of low resolution images by using the result(s) of the motion estimation. When synthesizing so, the high resolution image estimating means synthesizes the pixels by a synthesizing method which is in conformity with the motion estimation reliability evaluation value as output by the motion estimation reliability evaluating means, thereby synthesizing a plurality of low resolution images into a high resolution image.

Preferably, with the above program, the computer operating as the high resolution image estimating means synthesizes the high resolution image so that the high resolution image synthesized is affected only weakly by or remains unaffected by a pixel(s) of low reliability.

Preferably, with the above program, the computer operating as the high resolution image estimating means synthesizes the high resolution image so that the high resolution image synthesized is affected strongly by a pixel of high reliability.

Preferably, with the above program, the computer operating as the high resolution image estimating means synthesizes pixels of the low resolution images by using the result of the motion estimation with weighting values conforming to the motion estimation reliability evaluation value as output from the motion estimation reliability evaluating means.

Preferably, with the above program, the computer operating as the high resolution image estimating means synthesizes, in a combination of given two of the low resolution images, a motion of a pixel of interest of one of the two low resolution images towards the other low resolution image to output an estimated motion as a first result of estimation. Also preferably, the motion estimating means synthesizes a motion of a pixel in the other low resolution image corresponding to the pixel of interest towards the one low resolution image to output an the estimated motion as a second result of estimation.

The above computer also operates as a corresponding relationship evaluating means for calculating a motion estimation reliability evaluation value with respect to the first result of estimation based on the relationship of correspondence between the first result of motion estimation and the second result of motion estimation.

Preferably, with the above program, the first result of estimation and the second result of estimation are motion estimation vectors. Preferably, the computer operating as the corresponding relationship evaluating means calculates a motion estimation reliability evaluation value conforming to a magnitude of a sum vector of a motion estimation vector corresponding to the first result of estimation and a motion estimation vector corresponding to the second result of estimation.

Preferably, with the above program, the computer operates as an analogy degree evaluating means for calculating the motion estimation reliability evaluation value with respect to a result of motion estimation of the one pixel as estimated by the motion estimating means based on a degree of analogy in luminance between the one pixel and another pixel corresponding to the one pixel.

Preferably, with the above program, the computer is caused to operate as a motion distance evaluating means for calculating a motion distance evaluation value conforming to an amount of motion of the one pixel as estimated by the motion estimating means. The computer is also caused to operate as the high resolution image estimating means which, when synthesizing pixels of a plurality of the low resolution images by using the result of motion estimation, synthesizes the pixels with weighting conforming to a motion estimation reliability evaluation value output from the motion estimation reliability evaluation value and to the motion distance evaluation value calculated by the motion distance evaluating means.

Preferably, with the above program, the computer is caused to operate as a temporal distance evaluating means for calculating a temporal distance evaluating value conforming to a difference between time points of capturing the low resolution images. Also preferably, the computer is caused to operate as the high resolution image estimating means which, when synthesizing respective pixels of the low resolution images by using the result of motion estimation, synthesizes the pixels with weighting conforming to the motion estimation reliability evaluation value output from a motion estimation reliability evaluating means and to the temporal distance evaluation value calculated by the temporal distance evaluating means.

The motion estimating means references a plurality of input low resolution images to estimate the motion of pixels between the low resolution images to output the result of motion estimation. The motion estimation reliability evaluating means evaluates the reliability of the result of the motion estimation, output from the motion estimating means, based, e.g., on the degree of analogy of the luminance of the pixels, correlated by the result of the motion estimation, and outputs a motion estimation reliability evaluation value that represents the reliability degree. The high resolution image estimating means synthesizes the pixels of the input low resolution images by a synthesizing method that makes use of the motion estimation reliability evaluation value, output from the motion estimation reliability evaluating means, to generate a high resolution image.

It should be noted in this connection that, in synthesizing the respective pixels of the low resolution images, the high resolution image estimating means synthesizes the pixels of the low resolution images so that the effect of the pixels with a low reliability on the output high resolution image is weak or almost nil and so that the effect of the pixels with a high reliability on the output high resolution image is strong. By so doing, the respective pixels of the low resolution images may be synthesized by using the weighting which is in conformity with the motion estimation reliability evaluation value.

Meritorious Effect of the Invention

According to the present invention, such a meritorious effect may be achieved that it is possible to generate a high quality high resolution image with suppression of the noise ascribable to the motion estimation errors. The reason is that the reliability of the result of the motion estimation is evaluated and the reliability thus evaluated is taken into account for synthesizing the low resolution images. Since it is mainly the motion estimation error that is responsible for noise generation, a high resolution image of extremely high image quality may be generated by evaluating the reliability of the result of the motion estimation and by synthesizing the low resolution images depending on the so evaluated reliability. FIG. 20A shows a high resolution image generated by the conventional technique described in Non-Patent Document 1, and FIG. 20B shows a high resolution image generated by the apparatus for enhancement of image resolution according to the present invention. It may be seen from these figures that a noise-free high resolution image may be generated with the use of the apparatus for enhancement of image resolution according to the present invention.

BRIEF DESCRIPTION OF THE DRAWINGS

FIG. 5 is a diagram for illustrating another method for determining the analogy degree evaluation value $q(\alpha,\beta)$.

EXPLANATION OF NUMERALS

| PREFERRED MODES FOR CARRYING OUT THE INVENTION | |
|---|---|
| 1, 1a-1e | image resolution enhancement apparatus |
| 11 | motion estimating means |
| 12 | motion estimation reliability evaluating means |
| 121 | corresponding relationship evaluating means |
| 122 | analogy degree evaluating means |
| 13 | motion distance evaluating means |
| 131 | motion distance evaluating means |
| 132 | temporal distance evaluating means |
| 14 | motion estimation evaluating means |
| 15 | weighting matrix calculating means |
| 16 | high resolution image estimating means |
| 21 | motion estimating means |
| 22 | motion estimation reliability evaluating means |
| 23 | motion estimation evaluating means |
| 24 | weighting matrix calculating means |
| 25 | high resolution image estimating means |
| 31 | motion estimating means |
| 32 | motion estimation reliability evaluating means |
| 33 | motion distance evaluating means |
| 34 | motion estimation evaluating means |
| 35 | image synthesizing weight calculating means |
| 36 | high resolution image estimating means |
| 37 | basis image enlarging means |
| 38 | high resolution image synthesizing means |
| 41 | motion estimating means |
| 42 | motion estimation reliability evaluating means |
| 43 | motion estimation evaluating means |
| 44 | image synthesizing weight calculating means |
| 45 | high resolution image estimating means |
| 46 | basis image enlarging means |
| 47 | high resolution image synthesizing means |
| 51 | motion estimating means |
| 52 | motion estimation reliability evaluating means |
| 53 | motion distance evaluating means |
| 54 | motion estimation evaluating means |
| 55 | image synthesizing weight calculating means |
| 56 | weighting matrix calculating means |
| 57 | high resolution image estimating means |
| 58 | basis image enlarging means |
| 59 | high resolution image synthesizing means |
| 61 | motion estimating means |
| 62 | motion estimation reliability evaluating means |
| 63 | motion estimation evaluating means |
| 64 | image synthesizing weight calculating means |
| 65 | weighting matrix calculating means |
| 66 | high resolution image estimating means |
| 67 | basis image enlarging means |
| 68 | high resolution image synthesizing means |
| 71 | motion estimating means |
| 72 | high resolution image estimating means |
| 81 | basis image |
| 82 | first input image |
| 82 | second input image |
| 84 | N'th input image |
| 91 | motion estimating means |
| 92 | motion distance evaluating means |
| 93 | motion estimation evaluating means |
| 94 | weight generating means |
| 95 | high resolution image estimating means |

PREFERRED MODES FOR CARRYING OUT THE INVENTION

Certain preferred modes for carrying out the invention are now described with reference to the drawings.

First Exemplary Embodiment

Figure 1:
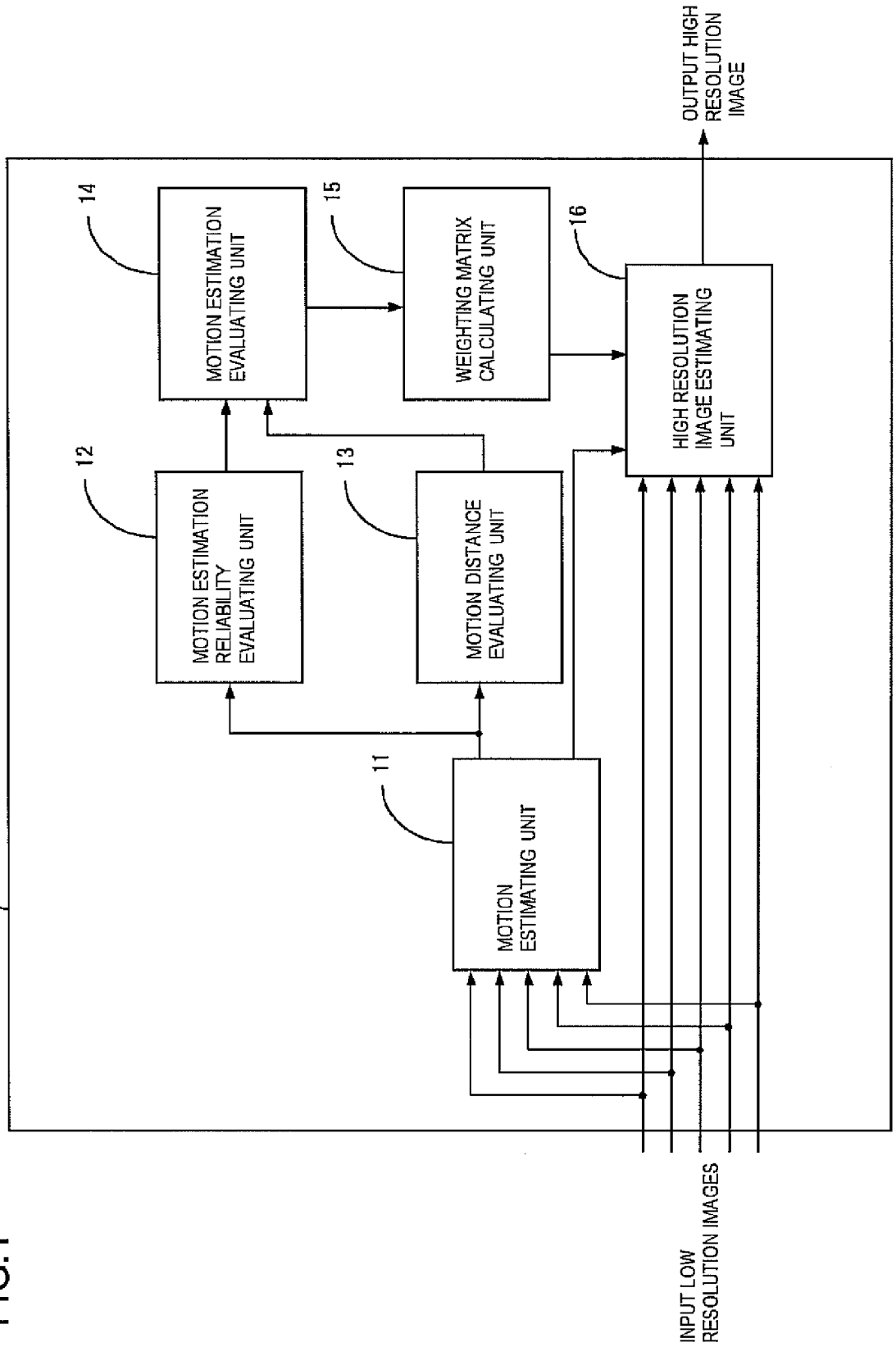
FIG. 1 is a block diagram showing a formulation of an image resolution enhancement apparatus according to a first exemplary embodiment of the present invention.
Figure 22:
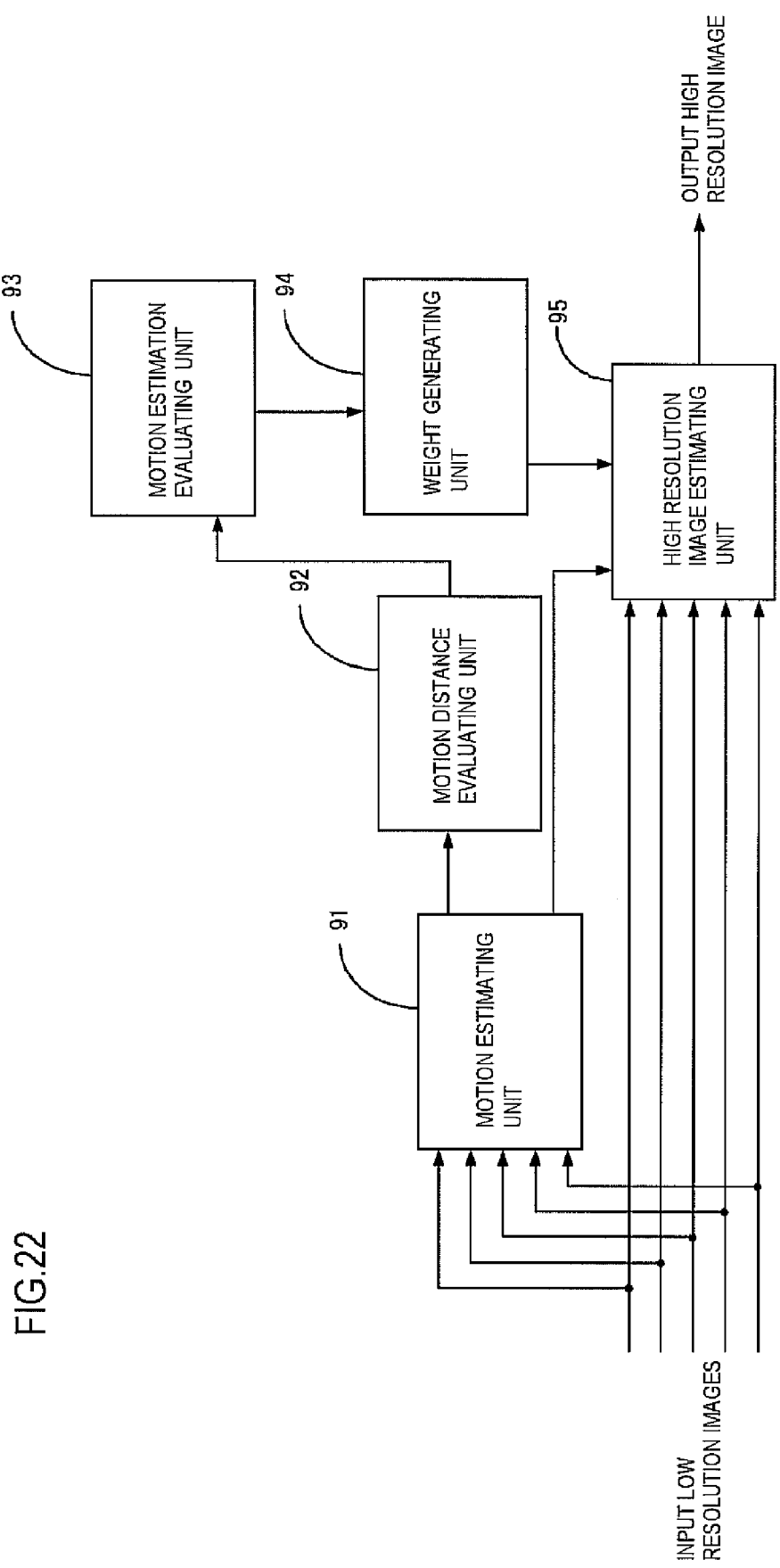
FIG. 22 is a block diagram for illustrating an example of the formulation of another conventional technique.

FIG. 1 depicts a block diagram showing an example of formulation of an image resolution enhancement apparatus 1 according to a first exemplary embodiment of the present invention. The image resolution enhancement apparatus 1 shown in FIG. 1 includes a motion estimating means 11, a motion estimation reliability evaluating means 12, a motion distance evaluating means 13, a motion estimation evaluating means 14, a weighting matrix calculating means 15 and a high resolution image estimating means 16. The image resolution enhancement apparatus receives an N number of low resolution images, each being of an image size equal to M, and delivers a high resolution image with the number of pixels equal to K. If FIG. 1 is compared to FIG. 22, it will be seen that the motion estimation reliability evaluating means 12 has now been added to the conventional image resolution enhancement apparatus.

Figure 2:
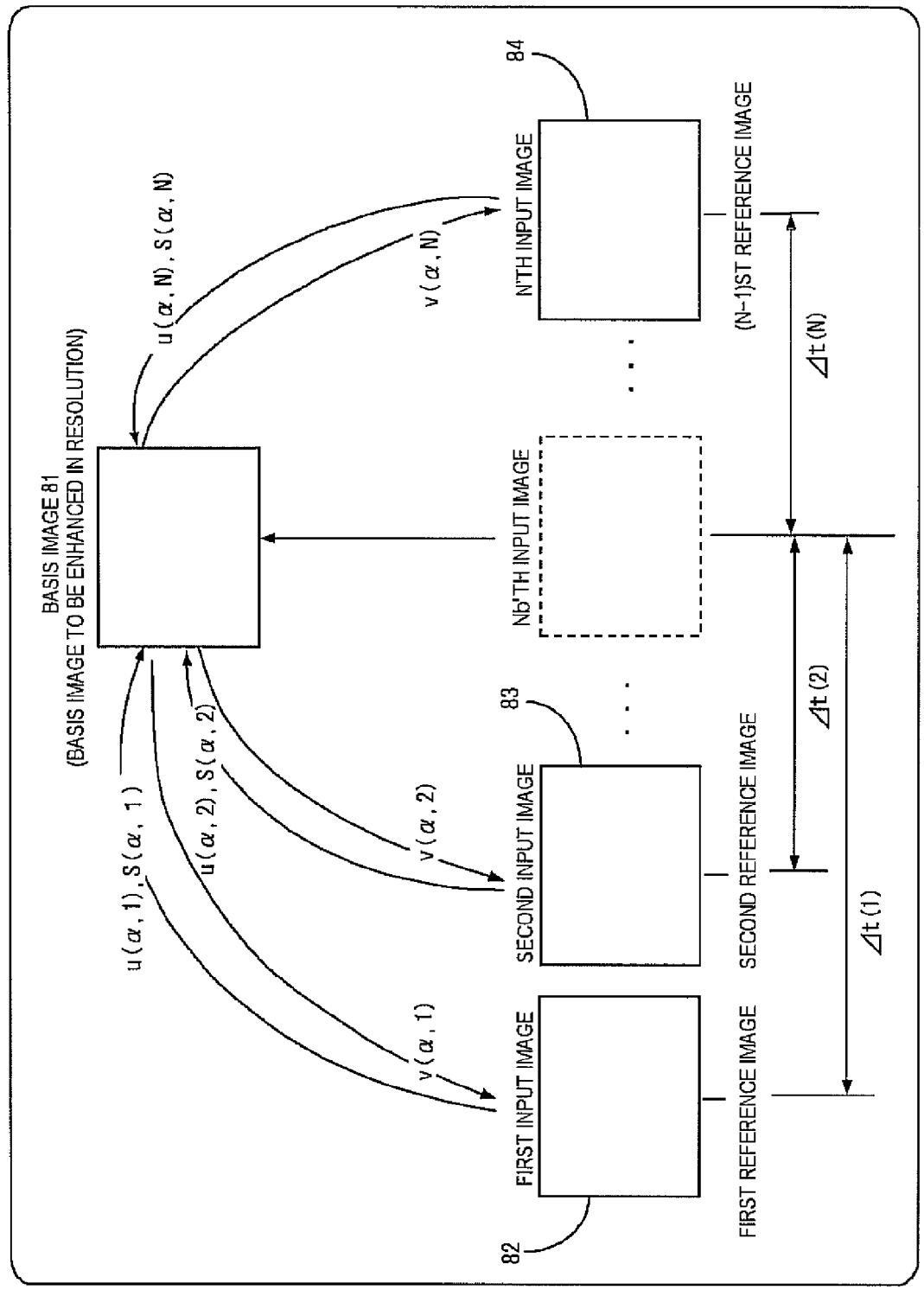
FIG. 2 is a schematic view for illustrating a formulation of a set of input low resolution images and the operation of a motion estimating means 11.

The motion estimating means 11 receives an N number of low resolution images and estimates pixel-to-pixel motions between a sole basis image and the remaining (N−1) number of the low resolution images (reference images) to deliver the results of motion estimation as an output. FIG. 2 depicts the operation of the motion estimating means 11. The motion estimating means 11 initially selects an Nb'th one of the N number of the low resolution images, as being a basis image 81, the resolution of which is to be enhanced. The images other than the basis image 81 are taken to be reference images. In the example of FIG. 2, reference images 82 to 84 are shown as the reference images. The motion estimating means 11 then calculates, using the aforementioned equations (1) and (2), a motion estimation vector $u(\alpha,\beta)$ for each pixel of each of the reference images 82 to 84 to the basis image 81, and a motion estimation vector $v(\alpha,\beta)$ for each pixel of the basis image 81 correlated with corresponding pixels of the reference images 82 to 84 to the basis image 81, and delivers them as output. It should be noted that $\beta$ denotes an index of a reference image defined by $1 \leq \beta \leq N$, where $\beta = Nb$ is excluded, and $\alpha$ denotes an index of a pixel defined by $1 \leq \alpha \leq M$. It should also be noted that the method of calculating $u(\alpha,\beta)$ and $v(\alpha,\beta)$ is not limited to that defined above. For example, such a method may be used in which motion estimation vectors u(α,β) and v(α,β) of a block including a pixel of interest α are estimated and the motion estimation vectors of all of the pixels contained in the block are taken to be the aforementioned motion estimation vectors.

The motion estimating means 11 performs processing operations other than the processing of outputting motion estimation vectors u(α,β) and v(α,β) as the results of the motion estimation. These processing operations include an operation of calculating the values of the matching distances S(α,β) that indicate the luminance analogy degree of each pixel of each of the reference images 82 to 84 to the pixel of the basis image 81 correlated therewith by the motion estimation vector u(α,β), and outputting the calculated values, and an operation of calculating the temporal distance Δt(β), relevant to the difference in the capturing time points of the basis image 81 and the reference images 82 to 84. As regards the temporal distance Δt(β), a difference value of the capturing time points, in terms of seconds as unit, or the difference value in the numbers of frames in a moving picture, for example, may be used.

An example of the method for calculating the values of the matching distances S(α,β) uses block matching according to the aforementioned equations (1) and (2). This method uses the peripheral information of the mutually correlated pixels and takes the sum of absolute values or the square sum of the differences between these pixels. If the equations (1) and (2) are used, the analogy degree becomes higher the smaller the values of the matching distances S(α,β), with the analogy degree becoming lower the larger the values of the matching distances S(α,β). There are other methods than this. For example, in calculating the values of the matching distances S(α,β), the range of the peripheral information used may be varied to calculate a plurality of values of the matching distances S(α,β), such as the values of the matching distances of larger peripheral areas or the values of the matching distances of smaller peripheral areas. Inasmuch as the value of the matching distance S(α,β) is intrinsically aimed at evaluating the degree of analogy between pixels, it is also possible to use such a method in which not the distance value such as sum total of the difference values of pixels but the analogy degree such as correlation coefficient of pixels in a given area is used. In addition, such as method may be used in which the matching distance S(α,β) between a block including a pixel of interest and a block corresponding thereto is found and used as the values of the matching distances S(α,β) of all of the pixels contained in the block. Such a method may also be used in which the absolute value or the square of the difference in luminance between corresponding pixels in the blocks is taken as the value of the matching distance S(α,β).

Figure 3:
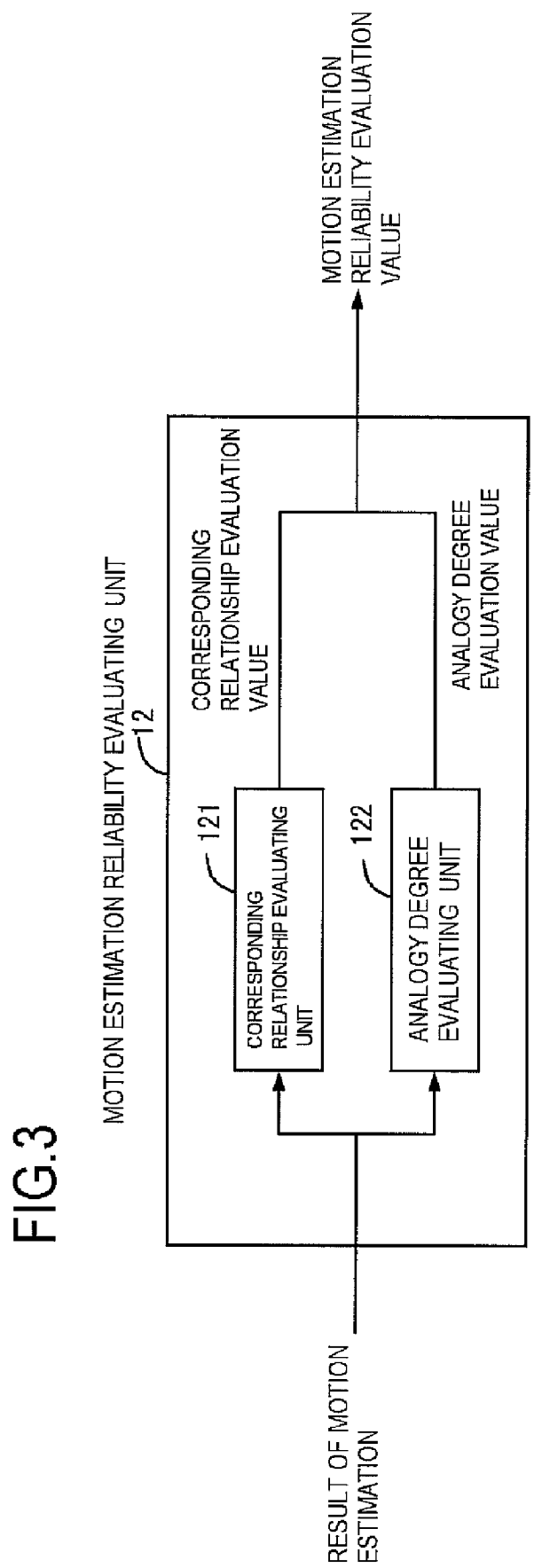
FIG. 3 is a block diagram showing an example of formulation of a motion estimation reliability evaluating means 12.

The motion estimation reliability evaluating means 12 receives the motion estimation vectors u(α,β) and v(α,β) and the values of the matching distances S(α,β), delivered as outputs from the motion estimating means 11, as input, to deliver corresponding relationship evaluation values ρ(α,β) and analogy degree evaluation values q(α,β) as outputs. FIG. 3 depicts a block diagram showing an example of formulation of the motion estimation reliability evaluating means 12. The motion estimation reliability evaluating means 12, shown in FIG. 3, includes a corresponding relationship evaluating means 121 and an analogy degree evaluating means 122.

Based on the motion estimation vectors u(α,β) and v(α,β), output from the motion estimating means 11, the corresponding relationship evaluating means 121 calculates a corresponding relationship evaluation value ρ(α,β) that indicates whether or not the pixel of interest of the reference image and a corresponding pixel of the basis image are correlated with each other by a one-for-one correspondence. The motion estimation vector u(α,β) represents the result of motion estimation from the reference image to the basis image and the motion estimation vector v(α,β) represents the result of motion estimation from the basis image to the reference image. Due to a variety of factors, the motion estimation vectors differ in general depending on whether the search basis is to be a basis image or reference images. However, the motion estimation vectors estimated should be equal in magnitude, no matter whether estimation is from the basis image or from the reference image, only the directions of the vectors being directly opposite to each other. That is, the more the equality relationship of u(α,β)+v(α,β)=0 is approached, the more accurate is to be the motion estimation vector as estimated. The corresponding relationship evaluation value ρ(α,β) becomes larger the closer the sum vector u(α,β)+v(α,β) is to zero, and becomes smaller the larger is the sum vector. An example of the method for calculating ρ(α,β) is shown in equation (5), where κ is a parameter that denotes a threshold value used to take account of ambiguity in sub-pixel estimation.

$$\rho = \begin{cases} 1.0 & (|u(\alpha,\beta) + v(\alpha,\beta)| \leq \kappa) \\ 0.0 & (|u(\alpha,\beta) + v(\alpha,\beta)| > \kappa) \end{cases} \quad (5)$$

Figure 4:
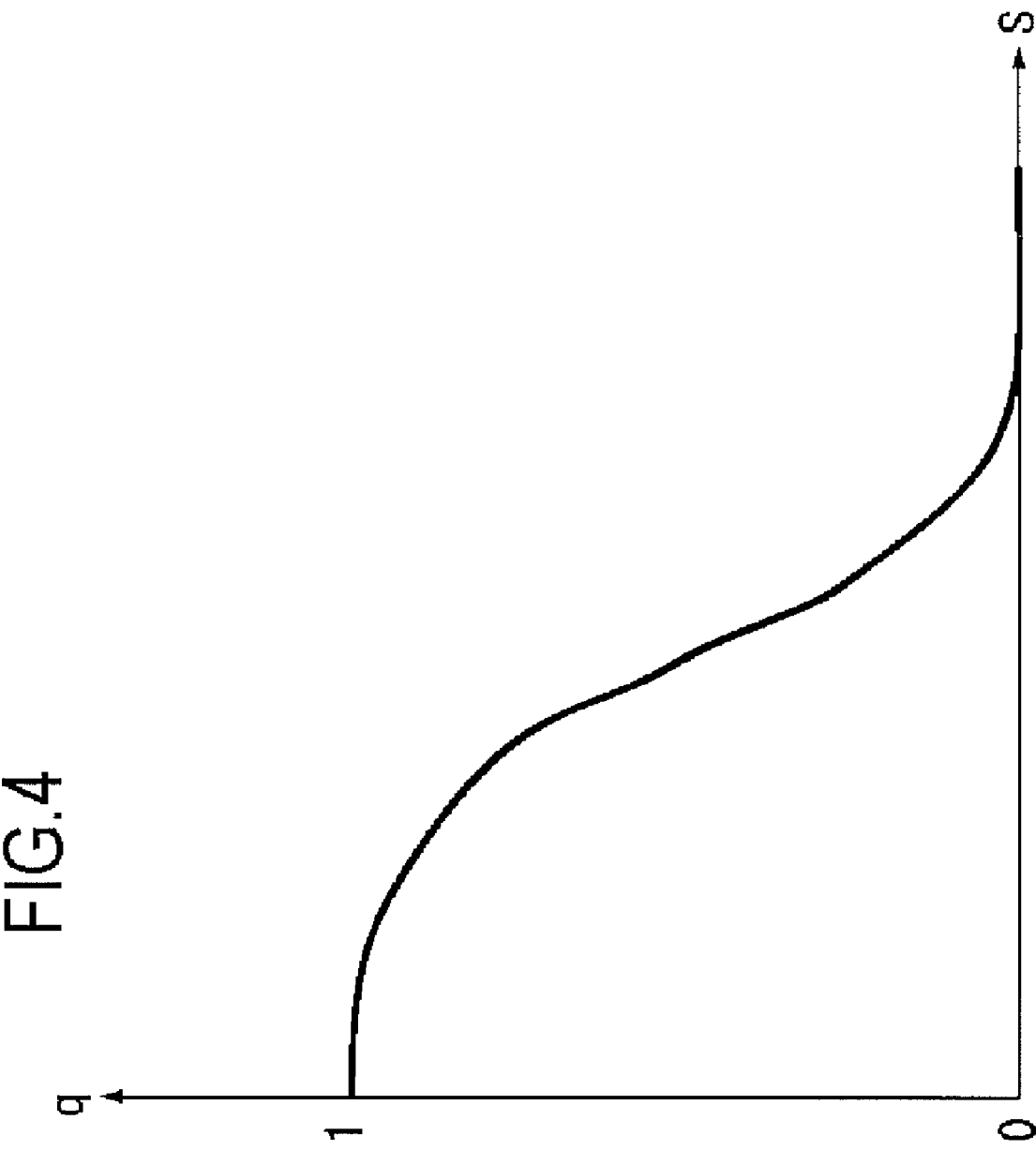
FIG. 4 is a graph for illustrating a method for determining an analogy degree evaluation value $q(\alpha,\beta)$.

Based on the matching distance value S(α,β) between the pixel of interest α of the reference image β and a corresponding pixel of the basis image, as output from the motion estimating means 11, the analogy degree evaluating means 122 calculates an analogy degree evaluation value q(α,β) in the pixel of interest α of a reference image β. As an example of the method for calculating an evaluation value in the analogy degree evaluating means 122, there is a method of converting the matching distance value S(α,β) into an analogy degree evaluation value q(α,β) using a graph shown in FIG. 4. That is, assuming that the reliability of the result of motion estimation becomes higher the smaller the matching distance value S(α,β), the analogy degree evaluation value q(α,β) is increased in such case. Conversely, assuming that the reliability of the result of motion estimation becomes lower the larger the matching distance value S(α,β), the analogy degree evaluation value q(α,β) is decreased. An example of calculating the analogy degree evaluation value q(α,β) uses the following equation (6) for calculations, in which $l_1$ and $l_2$ are preset constants, with $l_1 < l_2$.

$$q(\alpha,\beta) = \begin{cases} 1.0 & (S(\alpha,\beta) \leq l_1) \\ \dfrac{S(\alpha,\beta) - l_2}{l_1 - l_2} & (l_1 < S(\alpha,\beta) \leq l_2) \\ 0.0 & (l_2 < S(\alpha,\beta)) \end{cases} \quad (6)$$

Figure 5:
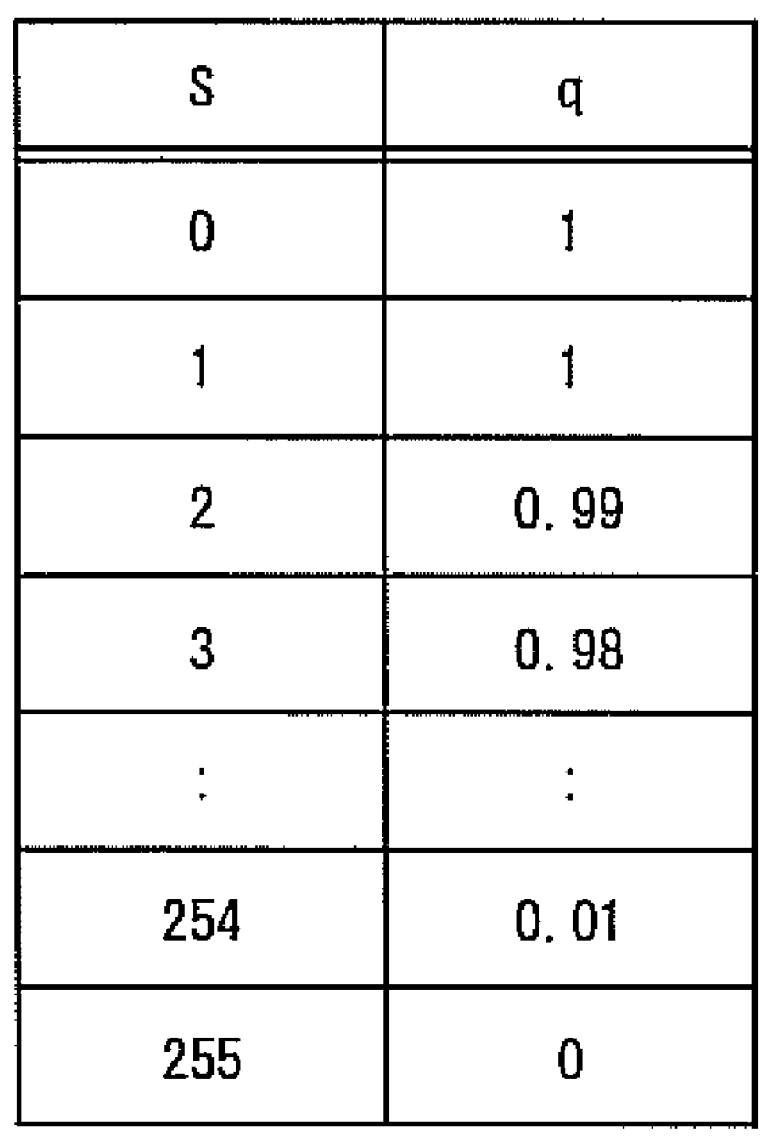

Instead of the above method, such a method may be used that consists in invoking (reading), from a preset table, shown in the diagram of FIG. 5, the matching distance values S(α,β) and the analogy degree evaluation values q(α,β) correlated with the matching distance values. The matching distance values and the matching analogy degree evaluation values are pre-stored as data in the above table. In case where the outputs of the motion estimating means 11 include a plurality of sorts of the matching distance value S(α,β) for a pixel of interest, such as global matching distance value for a large area, local matching distance value for a small area, matching distance of a block containing a pixel of interest, and/or the matching distance between the pixel of interest and a corresponding pixel, the analogy degree evaluation value q(α,β) may be calculated for each of the matching distance values S(α,β). A product of these analogy degree evaluation values may ultimately be delivered as an output of the analogy degree evaluating means 122.

Figure 6:
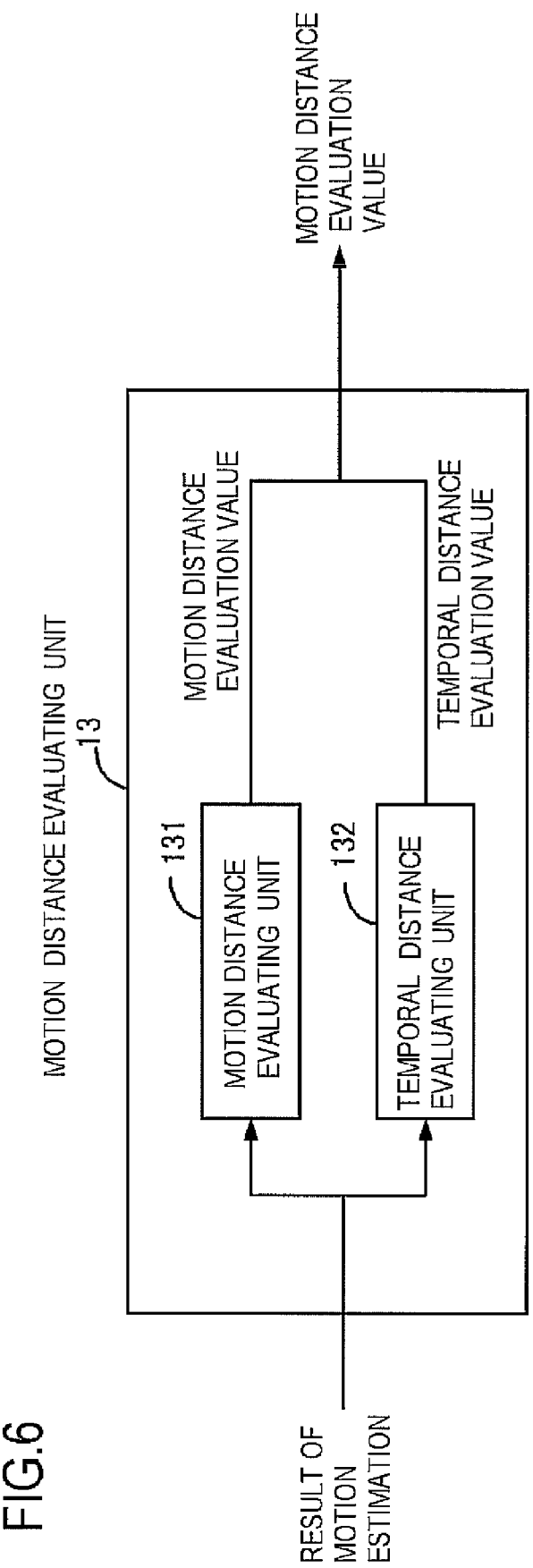
FIG. 6 is a block diagram for illustrating an example of formulation of a motion distance evaluating means 13.

The motion distance evaluating means 13 receives the motion estimation vector u(α,β) and the temporal distance Δt(β), output from the motion estimating means 11, and outputs the motion distance evaluation value r(α,β) and the temporal distance evaluation value s(α,β) as motion distance evaluation values. FIG. 6 depicts a block diagram showing an example of formulation of the motion distance evaluating means 13. Referring to FIG. 6, the motion distance evaluating means 13 includes a movement distance evaluating means 131 and a temporal distance evaluating means 132.

Figure 7:
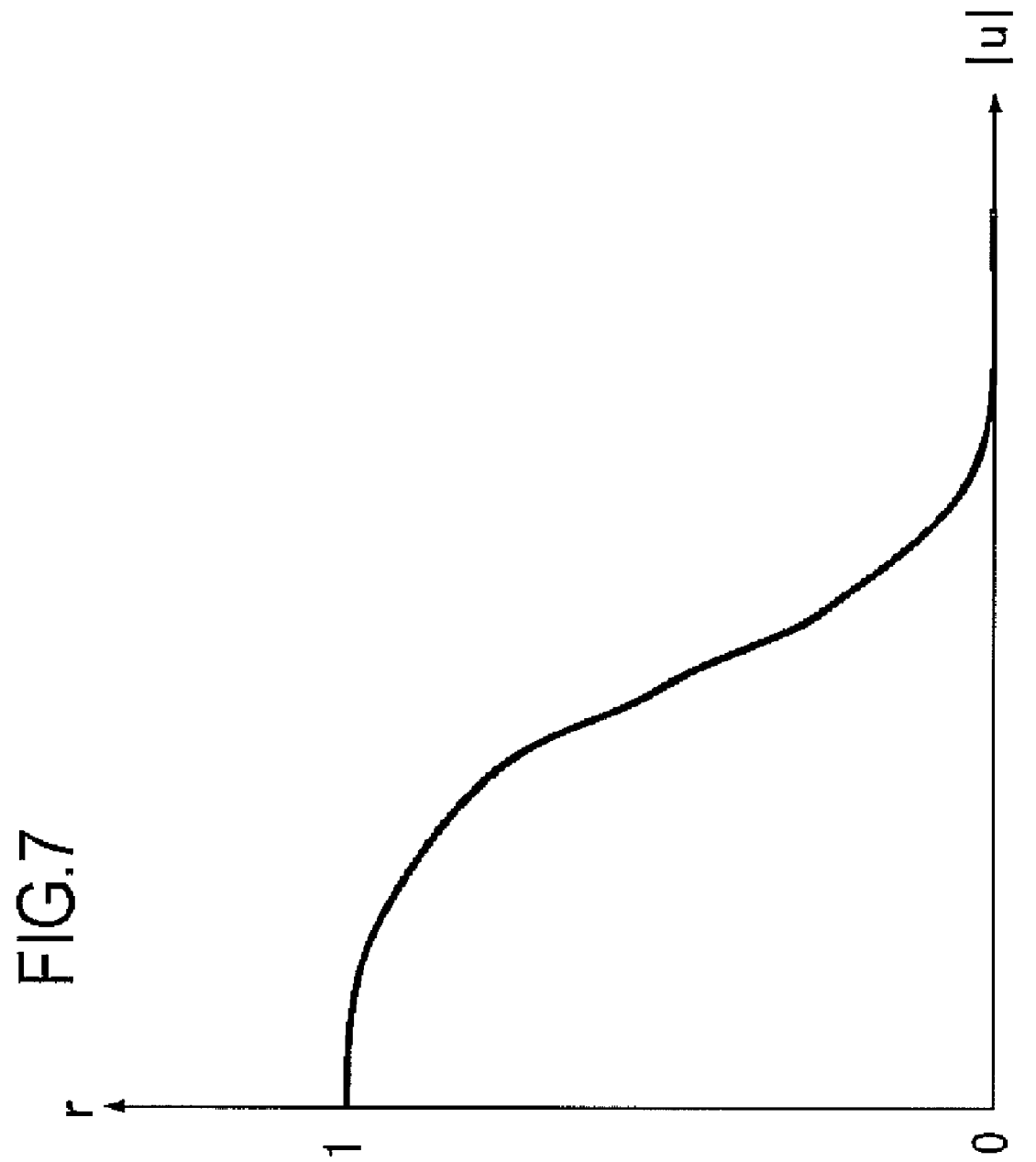
FIG. 7 is a graph for illustrating a method for determining a motion distance evaluation value $r(\alpha,\beta)$.

The movement distance evaluating means 131 calculates, from the motion estimation vector u(α,β), output from the motion estimating means 11, the motion distance evaluation value r(α,β), which takes into account the warping of the image caused by changes in the position relationship between an object to be captured (imaged) and a capturing medium. An example of the method for calculating the movement distance evaluation value in the motion distance evaluating means 131 is such a method in which the motion distance |u(α,β)| is converted into the motion distance evaluation value r(α,β), as shown by a graph of FIG. 7. The smaller the motion distance |u(α,β)|, the larger becomes the motion distance evaluation value r(α,β), whereas, the larger the motion distance |u(α,β)|, the smaller becomes the motion distance evaluation value r(α,β). An example of the method for calculating the motion distance evaluation value r(α,β) for a pixel of interest α of the input low resolution image n uses the following equation (7), for calculations, where $k_1$ and $k_2$ denote parameters, with $k_1 < k_2$.

$$r(\alpha, \beta) = \begin{cases} 1.0 & (|u(\alpha, \beta)| \le k_1) \\ \frac{|u(\alpha, \beta)| - k_2}{k_1 - k_2} & (k_1 < |u(\alpha, \beta)| \le k_2) \\ 0.0 & (k_2 < |u(\alpha, \beta)|) \end{cases} \quad (7)$$

In finding the motion distance evaluation value r(α,β), it may be invoked (read out) from a preset table, as with the method of finding the analogy degree evaluation value q(α, β).

Figure 8:
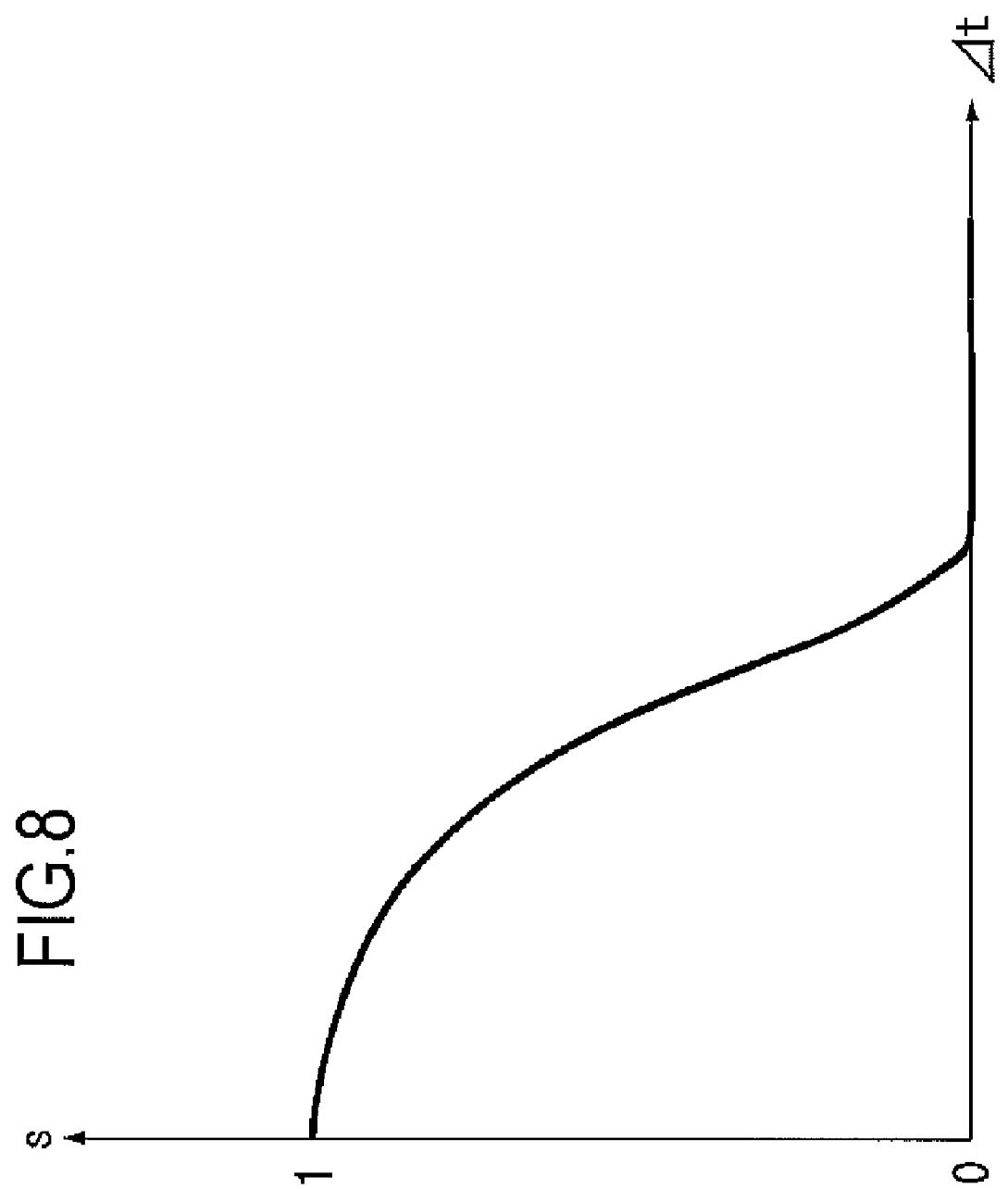
FIG. 8 is a graph for illustrating a method for determining a temporal distance evaluation value $s(\alpha,\beta)$.

The temporal distance evaluating means 132 outputs a temporal distance evaluation value s(β) which takes the warping caused by the difference in the timing of capturing (image-shooting) the low resolution images into account. The temporal distance evaluation value s(β) for the reference images β may be calculated by a function as determined conforming with the properties of the object to be captured and the capturing environment based on the temporal distance Δt(β) between the timing points of capturing the basis image and the reference images β. Since the quantity of motion is likely to be small for a small value of the temporal distance Δt(β), the result of evaluation is to be high. Conversely, with a larger value of the temporal distance Δt(β), the result of evaluation is to be low. FIG. 8 shows an example of conversion characteristics from the temporal distance Δt(β) to the temporal distance evaluation value s(β). The temporal distance evaluation value s(β) may also be found by referencing a table provided from the outset in accordance with characteristics of FIG. 8.

The motion estimation evaluating means 14 integrates the corresponding relationship evaluation values p(α,β), analogy degree evaluation value q(α,β), motion distance evaluation value r(α,β) and the temporal distance evaluation value s(β) to output a motion estimation evaluation value ρ(α,n) for each pixel of the low resolution image. As an example of the method for calculating the motion estimation evaluation value ρ(α,n), there is equation (8). The motion estimation evaluation value ρ(α,n) is valid for all of the low resolution images, inclusive of the basis image 81, and becomes 1.0 if n indicates the basis image Nb. The corresponding relationship evaluation value, analogy degree evaluation value, motion distance evaluation value and the temporal distance evaluation value become larger with the higher values of the results of evaluation. The motion estimation evaluation value ρ(α,n) in the equation (8) is expressed by taking a product of the respective evaluation values. It should be noted that the motion estimation evaluation value ρ(α,n) denotes the motion estimation evaluation value for the pixel a of the input low resolution image n. Another example of the method for calculating the motion estimation evaluation value ρ(α,n) integrates the evaluation values by taking an average value or a weighted average value instead of taking their products. The higher the motion estimation evaluation value ρ(α,n), the higher becomes the reliability of the motion estimation, whereas, the lower the motion estimation evaluation value, the lower is the reliability of motion estimation.

$$\rho(\alpha, n) = \begin{cases} 1.0 & (n = Nb) \\ p(\alpha, n)q(\alpha, n)r(\alpha, n)s(\alpha, n) & (1 \le n \le N, \text{ where } n \ne Nb) \end{cases} \quad (8)$$

The weighting matrix calculating means 15 outputs an N number of weighting matrices $W_n$, each of which is formed by an M number of rows and an M number of columns. These matrices express the strength of synthesis of the respective pixels of the input low resolution images. By controlling the strength of synthesis of the respective pixels of the low resolution images by the weighting matrices $W_n$, it is possible to suppress the noise otherwise produced by the motion estimation errors. As an example of the method for calculating the weighting matrix $W_n$ of the input low resolution image n, the following equation (9) is used for calculations, in which $W_n(i, j)$ denotes an element of the i'th row and a j'th column of the weighting matrix $W_n$ of the input low resolution image n ($1 \le i \le M$, $1 \le j \le M$). It should be noted that the larger the values of the elements of the weighting matrix $W_n$, the higher is the reliability of the motion estimation for the corresponding pixel, whereas, the smaller the values of the elements of the weighting matrix $W_n$, the lower is the reliability of the motion estimation for the corresponding pixel.

$$W_n(i, j) = \begin{cases} \rho(i, n) & (i = j) \\ 0 & (i \ne j) \end{cases} \quad (9)$$

The high resolution image estimating means 16 receives the low resolution images, motion estimation vector u(α,β), representing the result of the motion estimation, and the weighting matrices $W_n$, and outputs x, which will minimize the evaluation function represented by equation (10) or (11), as an estimated high resolution image having the number of pixels equal to K. If the value of an element of the weighting matrix $W_n$ is larger, that is, if the reliability is higher, the effect of the pixel corresponding to the element on the value of the evaluation function of the equation (10) or (11) becomes higher, with a consequence that the effect the pixel will have on the high resolution image is greater. If, conversely, the values of the elements of the weighting matrix $W_n$ are low, that is, if the reliability is low, the effect of the elements on the value of the evaluation function becomes low, with a consequence that the effect the pixel will have on the high resolution image is small. It should be noted that, similarly to the image transformation matrix An in the equations (3) and (4), the image transformation matrix An in the equations (10) and (11) contains the movements (motions) between the images and downsampling. The movements between the images reflect the motion estimation vector $u(\alpha,\beta)$ estimated by the motion estimating means 11.

$$f_1(x) = \sum_{\forall n} \|W_n(y_n - A_n x)\|^2 \quad (10)$$

$$f_2(x) = \sum_{\forall n} \|W_n(y_n - A_n x)\|^2 + \lambda \|C(x)\|^2 \quad (11)$$

The apparatus for image resolution enhancement 1, having the above functions, may be implemented by a computer. In case the apparatus is to be implemented by a computer, a recording medium, such as a disc or a semiconductor memory, having recorded thereon a program for the computer to operate as an apparatus for image resolution enhancement, is provided, and a computer is configured to read in the program. The computer has its own operation controlled in accordance with the so read-in program, whereby the motion estimating means 11, motion estimation reliability evaluating means 12, motion distance evaluating means 13, motion estimation evaluating means 14, weighting matrix calculating means 15 and the high resolution image estimating means 16 are implemented on the computer.

[Operation of the First Exemplary Embodiment]

Figure 9:
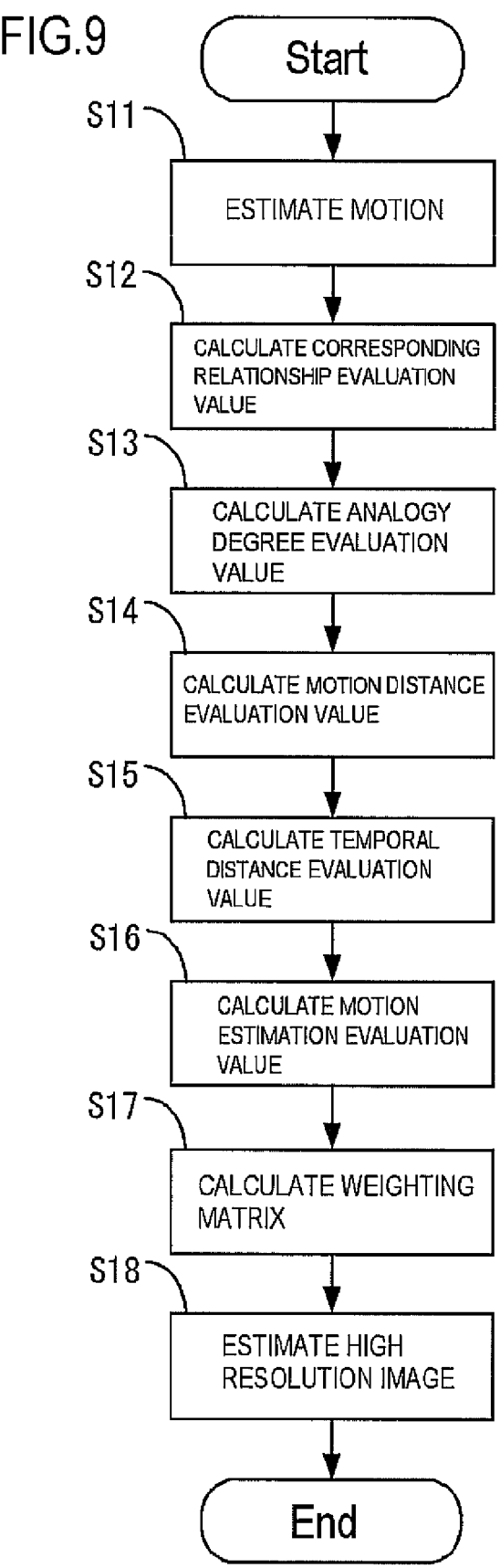
FIG. 9 is a flowchart for illustrating an example of the operation of the apparatus of the first exemplary embodiment.

The operation of the present exemplary embodiment is now described with reference to the flowchart of FIG. 9.

Initially, the motion estimating means 11 references the input N number of the low resolution images to perform the motion estimation to output the motion estimation vectors $u(\alpha,\beta)$ and $v(\alpha,\beta)$. The motion estimating means 11 further calculates and outputs the values of the matching distances $S(\alpha,\beta)$, while outputting the temporal distance $\Delta t(\beta)$ (step S11).

The corresponding relationship evaluating means 121 in the motion estimation reliability evaluating means 12 then references the motion estimation vectors $u(\alpha,\beta)$ and $v(\alpha,\beta)$ to calculate the corresponding relationship evaluation values $p(\alpha,\beta)$ of each pixel of each reference image with respect to the corresponding pixel in the basis image (step S12).

The analogy degree evaluating means 122 in the motion estimation reliability evaluating means 12 then references the values of the matching distances $S(\alpha,\beta)$ to calculate the analogy degree evaluation value $q(\alpha,\beta)$ of each pixel of the reference image with respect to the corresponding pixel in the basis image (step S13).

On completion of the processing by the motion estimation reliability evaluating means 12, the motion distance evaluating means 131 in the motion distance evaluating means 13 references the motion estimation vector $u(\alpha,\beta)$ to calculate the motion distance evaluation value $r(\alpha,\beta)$ of each pixel of the reference image (step S14).

Then, based on the temporal distance $\Delta t(\beta)$, the temporal distance evaluating means 132 in the motion distance evaluating means calculates the temporal distance evaluation value $s(\beta)$ (step S15).

The motion estimation evaluating means 14 then references the corresponding relationship evaluation values $p(\alpha,\beta)$ and the analogy degree evaluation value $q(\alpha,\beta)$, as calculated by the motion estimation reliability evaluating means 12, the motion distance evaluation value $r(\alpha,\beta)$ as calculated by the motion distance evaluating means 13, and the temporal distance evaluation value $s(\alpha,\beta)$, to calculate the motion estimation evaluation value $\rho(\alpha,n)$ (step S16).

The weighting matrix calculating means 15 then references the motion estimation evaluation value $\rho(\alpha,n)$ to calculate the weighting matrix $W_n$ (step S17).

Finally, the high resolution image estimating means 16 references the input low resolution images, motion estimation vector $u(\alpha,\beta)$, which is the result of the motion estimation, and the weighting matrices $W_n$, to estimate the high resolution image which will minimize the aforementioned equation (10) or (11) (step S18).

[Meritorious Effect of the First Exemplary Embodiment]

The present exemplary embodiment can yield a meritorious effect that there may be generated a high quality high resolution image freed of noises ascribable to the motion estimation error. The reason is that the motion estimation reliability evaluating means 12 evaluates the reliability in the result of motion estimation (motion estimation vector $u(\alpha,\beta)$ output from the motion estimating means 11 to output the motion estimation reliability evaluation values indicating the reliability degree (corresponding relationship evaluation values $p(\alpha,\beta)$ and the analogy degree evaluation value $q(\alpha,\beta)$), with the high resolution image estimating means 16 synthesizing the respective pixels of the respective low resolution images with weighting which is in conformity with the corresponding relationship evaluation values $p(\alpha,\beta)$ and the analogy degree evaluation value $q(\alpha,\beta)$.

Second Exemplary Embodiment

A second exemplary embodiment of the present invention is now described. It is noted that, with the above-described first exemplary embodiment, low resolution images are synthesized using the weighting matrices $W_n$ which take account not only of the corresponding relationship evaluation values $p(\alpha,\beta)$ and the analogy degree evaluation value $q(\alpha,\beta)$, representing the reliability degree of the result of motion estimation, but also the motion distance evaluation value $r(\alpha,\beta)$ and the temporal distance evaluation value $s(\beta)$. In the present exemplary embodiment, the low resolution images are synthesized using the weighting matrices $W_n$ which take account only of the corresponding relationship evaluation values $p(\alpha,\beta)$ and the analogy degree evaluation value $q(\alpha,\beta)$.

Figure 10:
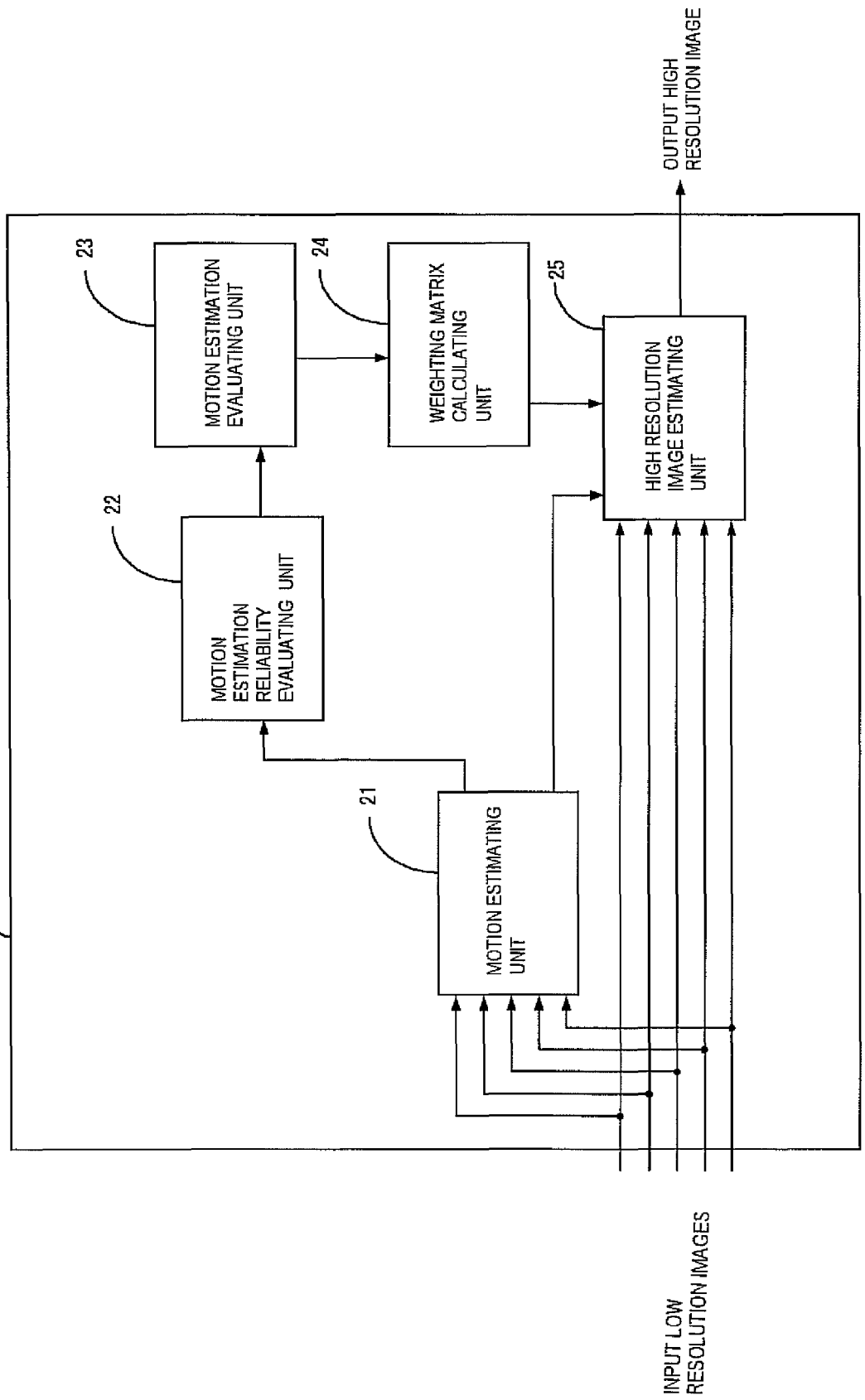
FIG. 10 is a block diagram showing an example of formulation of an image resolution enhancement apparatus according to a second exemplary embodiment of the present invention.

FIG. 10 depicts a block diagram showing an example of formulation of an image resolution enhancement apparatus 1a according to the second exemplary embodiment of the present invention. The image resolution enhancement apparatus 1a, shown in FIG. 10, includes a motion estimating means 21, a motion estimation reliability evaluating means 22, a motion estimation evaluating means 23, a weighting matrix calculating means 24 and a high resolution image estimating means 25. On comparing FIG. 10 to FIG. 22, it may be seen that the motion estimation reliability evaluating means 22 is provided in place of the motion distance evaluating means 92 of the conventional technique.

Similarly to the motion estimating means 11 of the previous first exemplary embodiment, the motion estimating means 21 receives the low resolution images, as input, and outputs the values of the matching distances $S(\alpha,\beta)$ and the motion estimation vectors $u(\alpha,\beta)$, $v(\alpha,\beta)$ representing the results of motion estimation between the reference images and the basis image. Meanwhile, the motion estimating means 21 of the present exemplary embodiment does not calculate the temporal distance $\Delta t(\beta)$.

Similarly to the motion estimation reliability evaluating means 12 of the previous first exemplary embodiment, the motion estimation reliability evaluating means 22 includes a corresponding relationship evaluating means, not shown, for outputting the corresponding relationship evaluation values $p(\alpha,\beta)$, and an analogy degree evaluating means, also not shown, for outputting the analogy degree evaluation value $q(\alpha,\beta)$.

The motion estimation evaluating means 23 integrates the corresponding relationship evaluation values $p(\alpha,\beta)$ and the analogy degree evaluation value $q(\alpha,\beta)$ to output the motion estimation evaluation values $\rho(\alpha,n)$ of the respective pixels of the input low resolution images. An example of the method for calculating the motion estimation evaluation values $\rho(\alpha,n)$ uses the equation (12) for calculations:

$$\rho(\alpha, n) = \begin{cases} 1.0 & (n = Nb) \\ p(\alpha, n)q(\alpha, n) & (1 \le n \le N, \text{where } n \ne Nb) \end{cases} \quad (12)$$

As another example of the method for calculating the motion estimation evaluation values $\rho(\alpha,n)$, the respective evaluation values may be integrated by taking an average value or a weighted average value in place of taking a product of the respective evaluation values.

Similarly to the weighting matrix calculating means 15 of the previous first exemplary embodiment, the weighting matrix calculating means 24 receives the motion estimation evaluation value $\rho(\alpha,n)$, as input, to calculate the weighting matrices $W_n$.

Similarly to the high resolution image estimating means 16 of the previous first exemplary embodiment, the high resolution image estimating means 25 references the input low resolution images, the motion estimation vector $u(\alpha,\beta)$, which is the result of the motion estimation, and the weighting matrices $W_n$, to estimate the high resolution image which will minimize the equation (10) or (11).

Similarly to the image resolution enhancement apparatus 1 of the previous first exemplary embodiment, the image resolution enhancement apparatus 1a of the present exemplary embodiment may be implemented by a computer.

[Operation of the Second Exemplary Embodiment]

Figure 11:
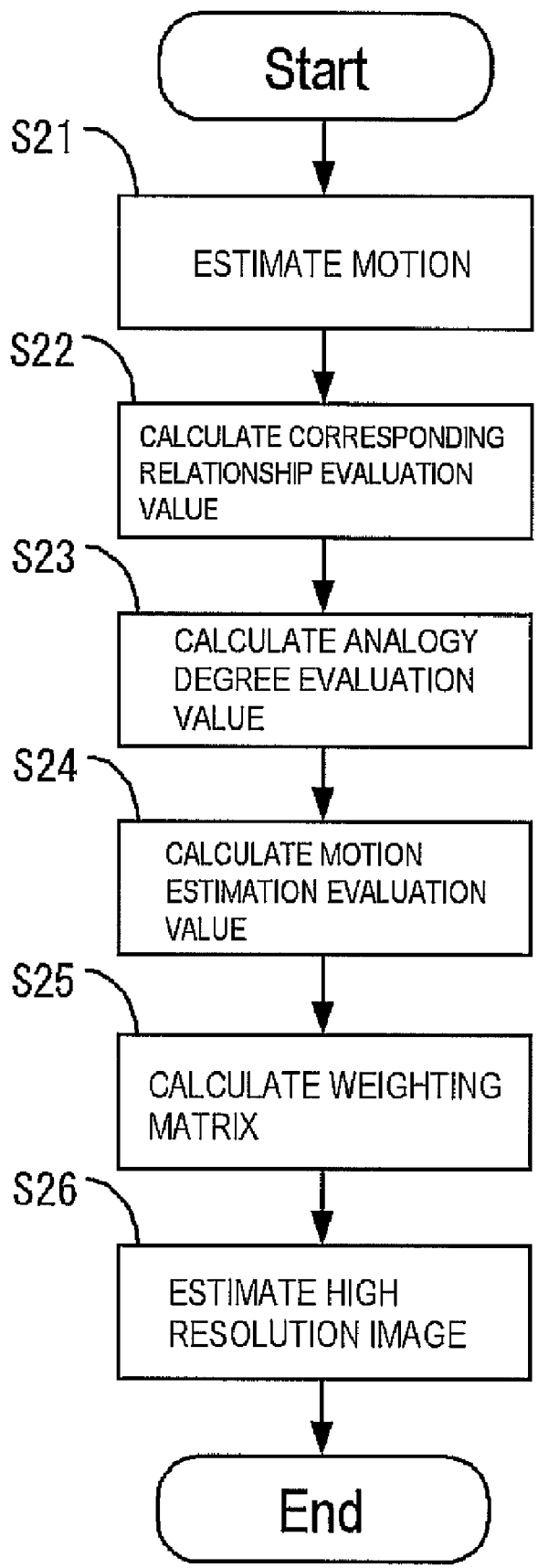
FIG. 11 is a flowchart for illustrating an example of operation of the apparatus of the second exemplary embodiment.

The operation of the present exemplary embodiment is now described with reference to the flowchart of FIG. 11.

Initially, the motion estimating means 21 references the input low resolution images to perform the motion estimation for outputting the motion estimation vectors $u(\alpha,\beta)$ and $v(\alpha,\beta)$, while outputting the values of the matching distances $S(\alpha,\beta)$ (step S21).

The corresponding relationship evaluating means, not shown, in the motion estimation reliability evaluating means 22 then references the motion estimation vectors $u(\alpha,\beta)$ and $v(\alpha,\beta)$, which stand for the result of the motion estimation, to calculate the corresponding relationship evaluation values $p(\alpha,\beta)$ of each pixel of each reference image with respect to the corresponding pixel in the basis image (step S22).

The analogy degree evaluating means in the motion estimation reliability evaluating means 22, not shown, then references the values of the matching distances $S(\alpha,\beta)$ to calculate the analogy degree evaluation value $q(\alpha,\beta)$ of each pixel of the reference images with respect to the corresponding pixels in the basis image (step S23).

The motion estimation evaluating means 23 references the corresponding relationship evaluation values $p(\alpha,\beta)$ and the analogy degree evaluation value $q(\alpha,\beta)$ to calculate the motion estimation evaluation value $\rho(\alpha,n)$ (step S24).

The weighting matrix calculating means 24 then references the motion estimation evaluation value $\rho(\alpha,n)$ to generate the weighting matrices $W_n$ (step S25).

Finally, the high resolution image estimating means 25 references the input low resolution images, the motion estimation vector $u(\alpha,\beta)$, which stand for the result of motion estimation, and the weighting matrices $W_n$, to estimate the high resolution image which will minimize the aforementioned equation (10) or (11) (step S26).

[Meritorious Effect of the Second Exemplary Embodiment]

The present exemplary embodiment can yield a meritorious effect that the processing speed may be made higher than that in the first exemplary embodiment to add to the meritorious effect derived from the first exemplary embodiment. The reason is that, in the present exemplary embodiment, only the corresponding relationship evaluation values $p(\alpha,\beta)$ and the analogy degree evaluation value $q(\alpha,\beta)$ are taken into account in determining the weighting. This contrasts to the previous first exemplary embodiment in which the motion distance evaluation value $r(\alpha,\beta)$ and the temporal distance evaluation value $s(\alpha,\beta)$ are taken into account, in addition to the corresponding relationship evaluation values $p(\alpha,\beta)$ and the analogy degree evaluation value $q(\alpha,\beta)$, in determining the weighting used in synthesizing the low resolution images. That is, with the present exemplary embodiment, it is possible to reduce the amount of computation. Since the main cause for noise generation in the high resolution image is the motion estimation error, a high resolution image of a sufficiently high image quality can be yielded in case solely the corresponding relationship evaluation values $p(\alpha,\beta)$ and the analogy degree evaluation value $q(\alpha,\beta)$ that stand for the degree of reliability with respect to the result of motion estimation are taken into account in determining the weighting, as in the present exemplary embodiment.

Third Exemplary Embodiment

Figure 12:
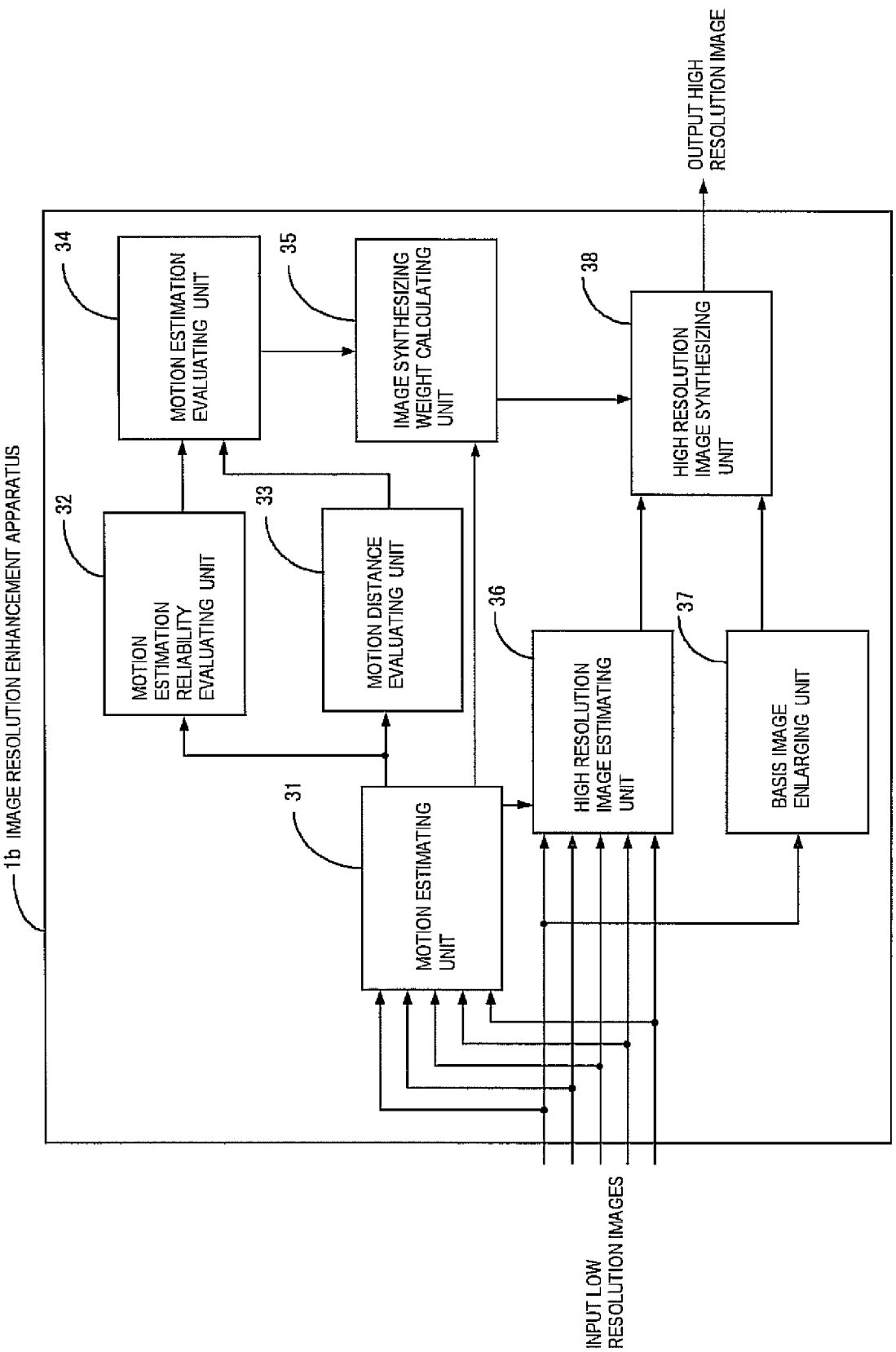
FIG. 12 is a block diagram showing a formulation of an image resolution enhancement apparatus according to a third exemplary embodiment of the present invention.

A third exemplary embodiment of the present invention is now described. FIG. 12 depicts a block diagram showing an example of the formulation of an image resolution enhancement apparatus 1b according to the third exemplary embodiment of the present invention. The image resolution enhancement apparatus 1b, shown in FIG. 12, includes a motion estimating means 31, a motion estimation reliability evaluating means 32, a motion distance evaluating means 33, a motion estimation evaluating means 34, an image synthesizing weight calculating means 35, a high resolution image estimating means 36, a basis image enlarging means 37 and a high resolution image synthesizing means 38. The image resolution enhancement apparatus 1b receives an N number of low resolution images, each being of an image size equal to M, to output a high resolution image with a number of pixels equal to K.

Similarly to the motion estimation means 11 of the first exemplary embodiment, the motion estimation means 31 receives the low resolution images, as input, to output the motion estimation vectors $u(\alpha,\beta)$ and $v(\alpha,\beta)$, which stand for the results of motion estimation between the reference images and the basis image, the values of the matching distances $S(\alpha,\beta)$ and the temporal distance $\Delta t(\beta)$.

Similarly to the motion estimation reliability evaluating means of the first exemplary embodiment, the motion estimation reliability evaluating means 32 includes a corresponding relationship evaluating means for outputting the corresponding relationship evaluation values $p(\alpha,\beta)$, not shown, and analogy degree evaluating means for outputting the analogy degree evaluation value $q(\alpha,\beta)$, also not shown.

Similarly to the motion distance evaluating means 13 of the first exemplary embodiment, the motion distance evaluating means 33 includes a motion distance evaluating means for outputting the motion (displacement) distance evaluation value $r(\alpha,\beta)$, not shown, and a temporal distance evaluating means for outputting the temporal distance evaluation value $s(\beta)$, also not shown.

Similarly to the motion estimation evaluating means 14 of the first exemplary embodiment, the motion estimation evaluating means 34 receives a corresponding relationship evaluation values $p(\alpha,\beta)$, an analogy degree evaluation value $q(\alpha,\beta)$, a motion distance evaluation value $r(\alpha,\beta)$ and a temporal distance evaluation value $s(\beta)$ to output a motion estimation evaluation value $\rho(\alpha,n)$.

The image synthesizing weight calculating means 35 references the motion estimation vector $u(\alpha,\beta)$, which stand for the result of the motion estimation, and the motion estimation evaluation value $\rho(\alpha,n)$, to calculate image synthesizing weights $\omega$ for the respective pixels that may be used in synthesizing an estimated high resolution image and an enlarged basis image. An example of the method for calculating the image synthesizing weights $\omega$ is now explained.

Initially, an average value of the motion estimation reliability $\phi(\gamma)$ for a pixel $\gamma$ of the basis image Nb is calculated, based on the motion estimation evaluation value $\rho(\alpha,n)$ and the motion estimation vector $u(\alpha,n)$ for the pixel a of the input low resolution image n. Since the pixels of the reference image n and the basis image Nb are correlated by the motion estimation vector $u(\alpha,n)$ from the reference image n to the basis image Nb, it is possible to find the motion estimation evaluation value $\rho(\alpha,n)$ relevant to the pixel $\gamma$ of the basis image Nb. In case n=Nb, $\rho(\alpha,Nb)$=1.0. The number of pixels (reference pixels) of the reference image corresponding to the pixel $\gamma$ of the basis image Nb is not constant and is varied depending on the state of the motion estimation vector $u(\alpha,n)$ obtained, that is, depending on whether or not the motion estimation is in error. Thus, if the number of pixels in the reference image corresponding to the pixel $\gamma$ is set to $\nu(\gamma)$ and the sum of the motion estimation evaluation values $\rho(\alpha,n)$ of the pixels of the reference image relevant to the pixel $\gamma$ is set to $\mu(\gamma)$, by definition, the average value of the motion estimation reliability $\phi(\gamma)$ is as shown in the following equation (13):

$$\phi(\gamma) = \frac{\mu(\gamma)}{\nu(\gamma)} \quad (13)$$

Next, the distribution of the average values of the motion estimation reliability $\phi(\gamma)$ is regarded as an image, and is enlarged using a routine method for interpolation, such as a Bi-Cubic method, to formulate a reliability map of the high resolution image size. A low frequency filter is applied to the formulated reliability map to smooth out the distribution. The result is output as an image synthesizing weight $\omega$.

The high resolution image estimating means 36 references the input low resolution image and the motion estimation vector $u(\alpha,\beta)$, which denote the result of motion estimation, to estimate a high resolution image (an estimated high resolution image) $x_1$. An example of the method for estimating the high resolution image in the high resolution image estimating means 36 is a method consisting in minimizing the evaluation function of the aforementioned equation (3) or (4).

The basis image enlarging means 37 enlarges the basis image Nb, the resolution of which is to be enhanced, by a routine interpolation technique, such as Bi-Cubic method, to calculate the high resolution picture (enlarged basis image) $x_2$. Meanwhile, the basis image Nb is taken among the input low resolution images, as described above, and high resolution images $x_1$, $x_2$ are of the same image size.

The high resolution image synthesizing means 38 references the high resolution image $x_1$, estimated by the high resolution image estimating means 36, the high resolution image $x_2$, calculated by the basis image enlarging means 37, and the image synthesizing weight $\omega$, calculated by the image synthesizing weight calculating means 35, to calculate an output high resolution image x. An example of the method for calculating the high resolution image x is shown by the equation (14), where k denotes a pixel value of the high resolution image with an image size of K ($1 \leq k \leq K$), and $x(k)$, $x_1(k)$, $x_2(k)$ and $\omega(k)$ stand for the values of x, $x_1$, $x_2$ and $\omega$ for the pixel k, respectively. The pixel with a larger value of $\omega(k)$, that is, with a high motion estimation reliability, is affected more strongly by the output high resolution image $x_1$ synthesized from a plurality of images. Conversely, the pixel with a smaller value of $\omega(k)$, that is, with low motion estimation reliability, is affected more strongly by the high resolution image $x_2$, enlarged from the basis image Nb, free from the noise produced by the motion estimation error.

$$x(k)=\omega(k)x_1(k)+(1-\omega(k))x_2(k) \quad (14)$$

It should be noted that, similarly to the image resolution enhancement apparatus 1, 1a, the image resolution enhancement apparatus 1b may be implemented by a computer.

[Description of the Operation of the Third Embodiment]

Figure 13:
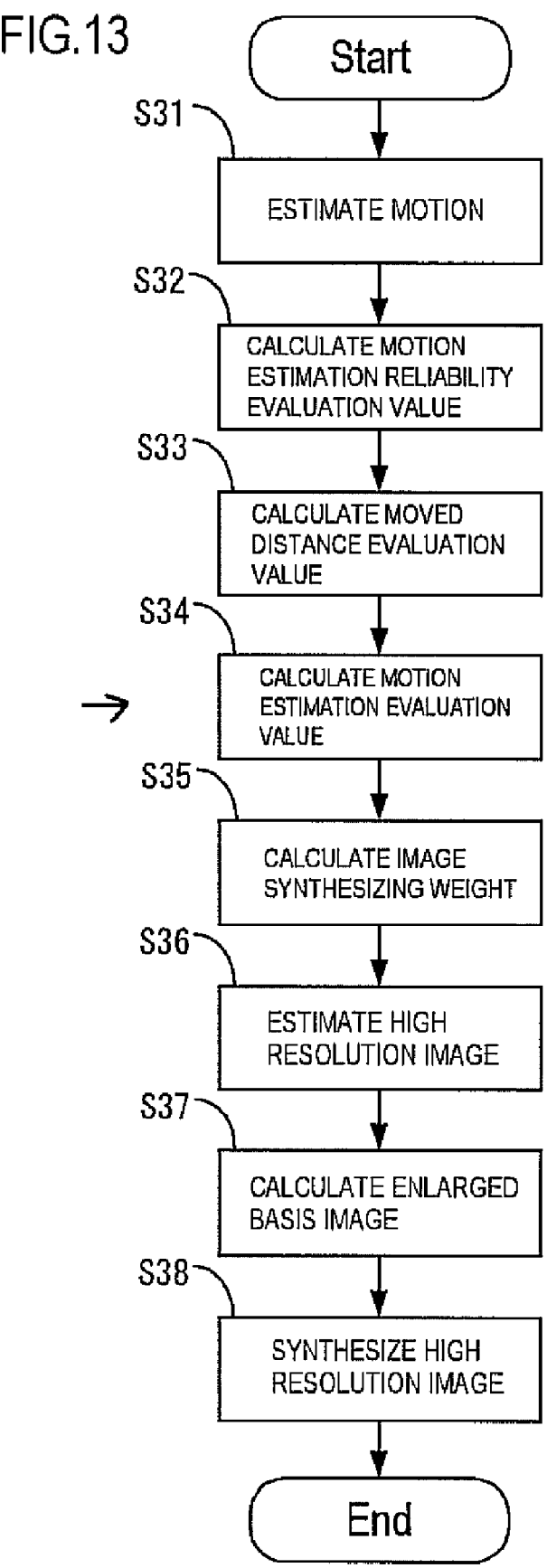
FIG. 13 is a flowchart for illustrating an example of operation of the apparatus of the third exemplary embodiment.

The operation of the present exemplary embodiment is now described with reference to the flowchart of FIG. 13.

Initially, the motion estimating means 31 references the input low resolution images to carry out motion estimation to output the motion estimation vectors $u(\alpha,\beta)$ and $v(\alpha,\beta)$. The motion estimating means 31 further outputs the values of the matching distances $S(\alpha,\beta)$ and the temporal distance $\Delta t(\beta)$ (step S31).

The motion estimation reliability evaluating means 32 then calculates the corresponding relationship evaluation values $p(\alpha,\beta)$, based on the motion estimation vectors $u(\alpha,\beta)$ and $v(\alpha,\beta)$, while calculating the analogy degree evaluation value $q(\alpha,\beta)$, based on the values of the matching distances $S(\alpha,\beta)$ (step S32).

The motion distance evaluating means 33 then calculates the motion distance evaluation value $r(\alpha,\beta)$, based on the motion estimation vector $u(\alpha,\beta)$, while calculating the temporal distance evaluation value $s(\beta)$, based on the temporal distance $\Delta t(\beta)$ (step S33).

The motion estimation evaluating means 34 then executes the calculations, shown by the aforementioned equation (9), on the corresponding relationship evaluation values $p(\alpha,\beta)$, analogy degree evaluation value $q(\alpha,\beta)$, motion distance evaluation value $r(\alpha,\beta)$ and the temporal distance evaluation value $s(\beta)$, to calculate the motion estimation evaluation value $\rho(\alpha,n)$ (step S34).

The image synthesizing weight calculating means 35 then references the motion estimation vector $u(\alpha,\beta)$, which is the result of the motion estimation, and the motion estimation evaluation value $\rho(\alpha,\beta)$, to calculate the image synthesizing weight $\omega$ that is used to synthesize the estimated high resolution image and the enlarged basis image (step S35).

The high resolution image estimating means 36 then references the input low resolution images and the results of the motion estimation, to estimate the high resolution image which will minimize the aforementioned equation (3) or (4) (step S36).

The basis image enlarging means 37 then references the basis image Nb, among the input low resolution images, which is to be enhanced in resolution, to calculate the enlarged basis image enlarged from the basis image Nb (step S37).

Finally, the high resolution image synthesizing means 38 references the estimated high resolution image, obtained by the high resolution image estimating means 36, the enlarged basis image, obtained by the basis image enlarging means 37, and the image synthesizing weight ω, obtained by calculations by the image synthesizing weight calculating means 35, to calculate an output high resolution image (step S38).

[Meritorious Effect of the Third Exemplary Embodiment]

With the present exemplary embodiment, it is possible to derive the meritorious effect similar to that of the first exemplary embodiment.

Fourth Exemplary Embodiment

Figure 14:
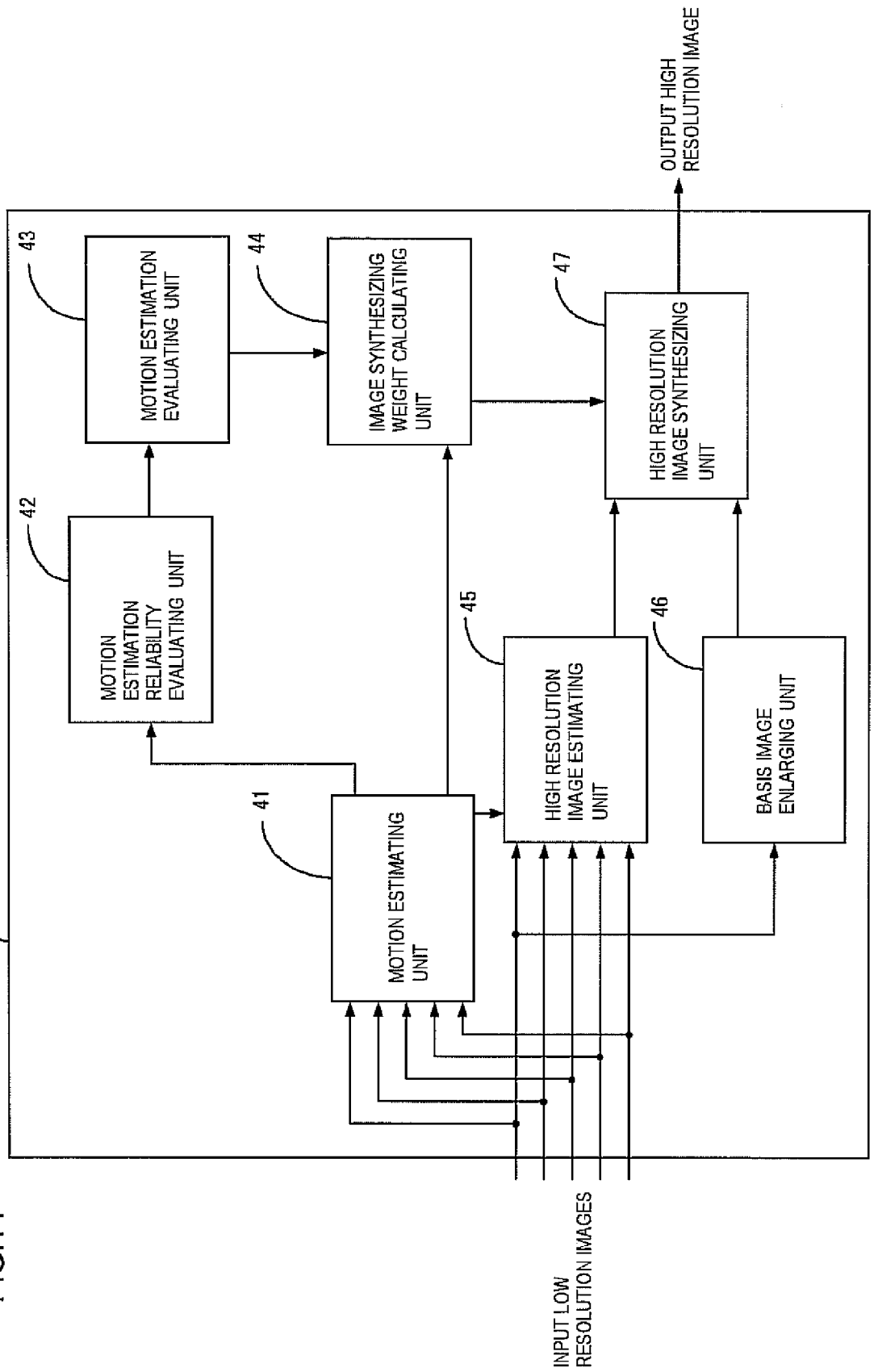
FIG. 14 is a block diagram showing an example of formulation of an image resolution enhancement apparatus according to a fourth exemplary embodiment of the present invention.

A fourth exemplary embodiment of the present invention is now described. FIG. 14 depicts a block diagram showing an example of formulation of an image resolution enhancement apparatus 1c according to the fourth exemplary embodiment of the present invention. The image resolution enhancement apparatus 1c, shown in FIG. 14, includes a motion estimating means 41, a motion estimation reliability evaluating means 42, a motion estimation evaluating means 43, an image synthesizing weight calculating means 44, a high resolution image estimating means 45, a basis image enlarging means 46 and a high resolution image synthesizing means 47. The image resolution enhancement apparatus 1c receives an N number of the low resolution images, each being of an image size equal to M, and outputs a high resolution image with the number of pixels equal to K.

Similarly to the motion estimating means 21 of the second exemplary embodiment, the motion estimating means 41 receives the low resolution images as inputs, and outputs the motion estimation vectors $u(\alpha,\beta)$ and $v(\alpha,\beta)$ that stand for the results of estimation of the motion between the reference image and the basis image, and the values of the matching distances $S(\alpha,\beta)$.

Similarly to the motion estimation reliability evaluating means 12 of the first exemplary embodiment, the motion estimation reliability evaluating means 42 includes a corresponding relationship evaluating means, not shown, and analogy degree evaluating means, also not shown, in its inside, and outputs corresponding relationship evaluation values $p(\alpha,\beta)$ and analogy degree evaluation values $q(\alpha,\beta)$.

Similarly to the motion estimation evaluating means 23, the motion estimation evaluating means 43 receives the corresponding relationship evaluation values $p(\alpha,n)$ analogy degree evaluation value $q(\alpha,\beta)$, as inputs, to output a motion estimation evaluation value $\rho(\alpha,n)$.

Similarly to the image synthesizing weight calculating means 35 of the third exemplary embodiment, the image synthesizing weight calculating means 44 references the motion estimation vector $u(\alpha,\beta)$ that stands for the result of the motion estimation, and the motion estimation evaluation value $\rho(\alpha,n)$, to calculate the weights ω of the respective pixels which may be used to synthesize the high resolution image estimated by the high resolution image estimating means 45 and the basis image enlarged by the basis image enlarging means 46.

Similarly to the high resolution image estimating means 36 of the third exemplary embodiment, the high resolution image estimating means 45 references the input low resolution image and the result of the motion estimation to estimate a high resolution image $x_1$.

Similarly to the basis image enlarging means 37 of the third exemplary embodiment, the basis image enlarging means 46 enlarges the basis image, among the input low resolution images, which is to be enhanced in resolution, by a routine interpolation technique, such as Bi-Cubic method, to calculate a high resolution image $x_2$.

Similarly to the high resolution image synthesizing means 38 of the third exemplary embodiment, the high resolution image synthesizing means 47 references the high resolution image $x_1$, estimated by the high resolution image estimating means 45, the high resolution image $x_2$, calculated by the basis image enlarging means 46, and the image synthesizing weight ω, calculated by the image synthesizing weight calculating means 44, to calculate an output high resolution image x.

It should be noted that the image resolution enhancement apparatus 1c of the present exemplary embodiment, similarly to the image resolution enhancement apparatus 1, 1a and 1b, may be implemented by a computer.

[Operation of the Fourth Exemplary Embodiment]

Figure 15:
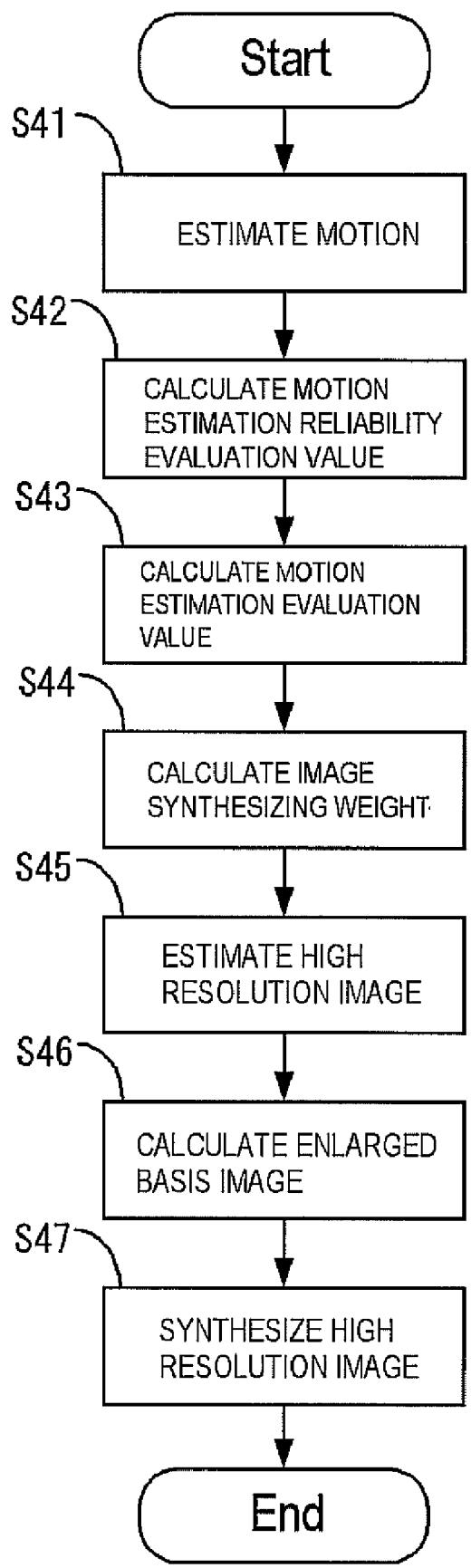
FIG. 15 is a flowchart for illustrating an example of operation of the apparatus of the fourth exemplary embodiment.

The operation of the present exemplary embodiment is now described with reference to the flowchart of FIG. 15.

Initially, the motion estimating means 41 references the input low resolution images to perform the motion estimation to output the motion estimation vectors $u(\alpha,\beta)$ and $v(\alpha,\beta)$. The motion estimating means 41 further outputs the values of the matching distances $S(\alpha,\beta)$ (step S41).

The motion estimation reliability evaluating means 42 then references the motion estimation vectors $u(\alpha,\beta)$, $v(\alpha,\beta)$ and the values of the matching distances $S(\alpha,\beta)$ to calculate the corresponding relationship evaluation values $p(\alpha,\beta)$ and the analogy degree evaluation value $q(\alpha,\beta)$ (step S42).

The motion estimation evaluating means 43 then performs calculations indicated by the aforementioned equation (12), on the corresponding relationship evaluation values $p(\alpha,\beta)$ and the analogy degree evaluation value $q(\alpha,\beta)$, to calculate the motion estimation evaluation value $\rho(\alpha,n)$ (step S43).

The image synthesizing weight calculating means 44 then references the motion estimation vector $u(\alpha,\beta)$ and the motion estimation evaluation value $\rho(\alpha,n)$ to calculate the image synthesizing weight ω used for synthesizing the estimated high resolution image and the enlarged reference image together (step S44).

Thereafter, the high resolution image estimating means 45 references the input low resolution images and the motion estimation vector $u(\alpha,\beta)$, representing the result of the motion estimation, to estimate the high resolution image which will minimize the aforementioned equation (3) or (4) (step S45).

The basis image enlarging means 46 then references the basis image Nb, among the input low resolution images, which is to be enhanced in resolution. The basis image enlarging means then calculates the enlarged basis image which is an enlarged version of the basis image Nb (step S46)

Finally, the high resolution image synthesizing means 47 references the estimated high resolution image, enlarged basis image and the image synthesizing weight ω to calculate an output high resolution image (step S47).

[Meritorious Effect of the Fourth Exemplary Embodiment]

With the present exemplary embodiment, it is possible to achieve the meritorious effect comparable with that achieved with the second exemplary embodiment.

Fifth Exemplary Embodiment

A fifth exemplary embodiment of the present invention is now described.

Figure 16:
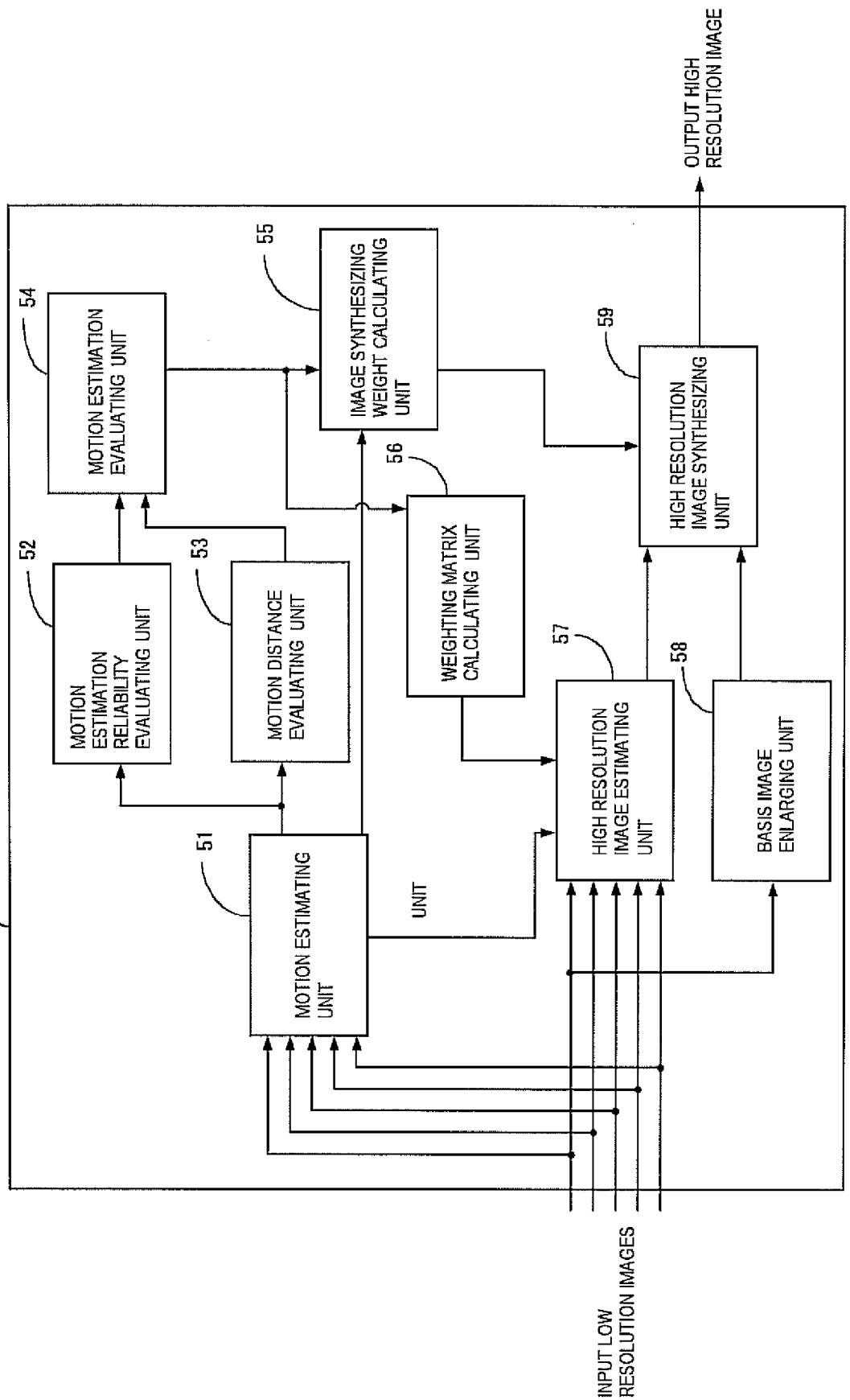
FIG. 16 is a block diagram showing a formulation of an image resolution enhancement apparatus according to a fifth exemplary embodiment of the present invention.

FIG. 16 depicts an example of formulation of an image resolution enhancement apparatus $1d$ according to a fifth exemplary embodiment of the present invention. The image resolution enhancement apparatus $1d$, shown in FIG. 16, includes a motion estimating means 51, a motion estimation reliability evaluating means 52, a motion distance evaluating means 53, a motion estimation evaluating means 54, an image synthesizing weight calculating means 55, a weighting matrix calculating means 56, a high resolution image estimating means 57, a basis image enlarging means 58 and a high resolution image synthesizing means 59.

Similarly to the motion estimating means 11 of the first exemplary embodiment, the motion estimating means 51 receives low resolution images, as input, and outputs motion estimation vectors $u(\alpha,\beta)$ and $v(\alpha,\beta)$, which stand for the results of estimation of the motion between the reference images and the basis image, while outputting matching distances $S(\alpha,\beta)$ and the temporal distance $\Delta t(\beta)$.

Similarly to the motion estimation reliability evaluating means 12 of the first exemplary embodiment, the motion estimation reliability evaluating means 52 includes a correspondence relationship evaluating means, not shown, and an analogy evaluating means, also not shown, which respectively output the corresponding relationship evaluation values $p(\alpha,\beta)$ and the analogy degree evaluation value $q(\alpha,\beta)$.

Similarly to the motion distance evaluating means 13, the motion distance evaluating means 53 includes a motion distance evaluating means, not shown, and a temporary distance evaluating means, also not shown, which respectively output a motion distance evaluation value $r(\alpha,\beta)$ and a temporal distance evaluation value $s(\beta)$.

Similarly to the motion estimation evaluating means 14, the motion estimation evaluating means 54 receive the corresponding relationship evaluation values $p(\alpha,\beta)$, analogy degree evaluation value $q(\alpha,\beta)$, motion distance evaluation value $r(\alpha,\beta)$ and the temporal distance evaluation value $s(\beta)$ to output the motion estimation evaluation value $\rho(\alpha,n)$.

Similarly to the image synthesizing weight calculating means 35 of the third exemplary embodiment, the image synthesizing weight calculating means 55 references the motion estimation vector $u(\alpha,\beta)$, which stands for the result of the motion estimation, and the motion estimation evaluation value $\rho(\alpha,n)$, to calculate the weights $\omega$ of the respective pixels used for synthesizing the estimated high resolution image and the enlarged basis image.

Similarly to the weighting matrix calculating means 15 of the first exemplary embodiment, the weighting matrix calculating means 56 receives the motion estimation evaluation value, as input, and calculates the weighting matrices $W_n$.

Similarly to the high resolution image estimating means 16, the high resolution image estimating means 57 references the input low resolution images, motion estimation vector $u(\alpha,\beta)$, which stands for the result of the motion estimation, and the weighting matrices $W_n$, to estimate the high resolution image (estimated high resolution image) $x_3$ which will minimize the equation (10) or (11).

Similarly to the basis image enlarging means 37 of the third exemplary embodiment, the basis image enlarging means 58 enlarges the basis image Nb, among the input low resolution images, which has to be enhanced in resolution, by a routine interpolation technique, such as Bi-Cubic method, to calculate the high resolution picture $x_2$.

Similarly to the high resolution image synthesizing means 38 of the third exemplary embodiment, the high resolution image synthesizing means 59 references the high resolution image $x_3$, estimated by the high resolution image estimating means 57, the high resolution picture $x_2$ calculated by the basis image enlarging means 58, and the image synthesizing weight $\omega$, calculated by the image synthesizing weight calculating means 55, to calculate the output high resolution image x.

It should be noted that, similarly to the other image resolution enhancement apparatus 1 and $1a$ to $1c$, the image resolution enhancement apparatus $1d$ of the present exemplary embodiment, may be implemented by a computer.

[Explanation of the Operation of the Fifth Exemplary Embodiment]

Figure 17:
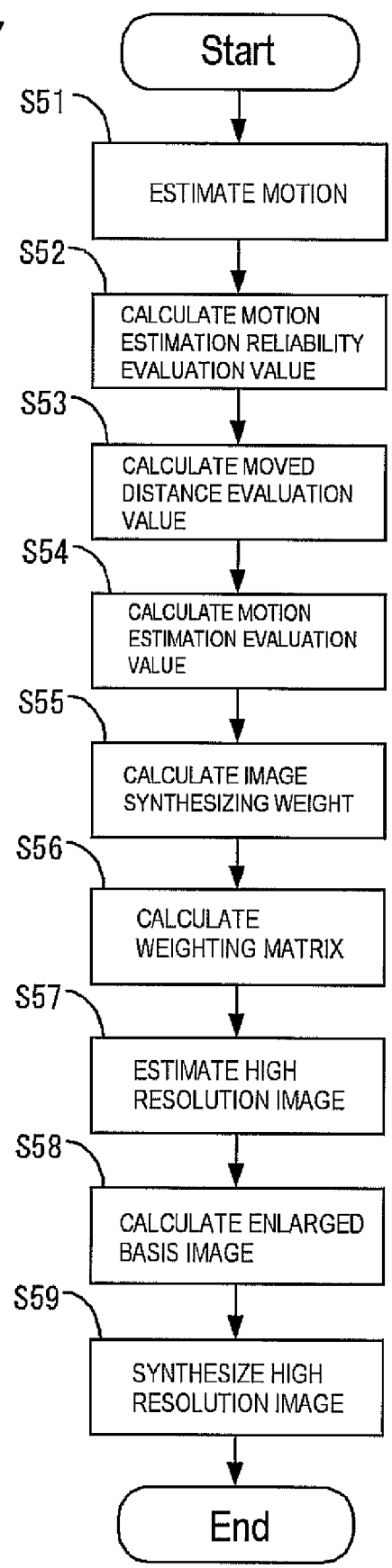
FIG. 17 is a flowchart for illustrating an example of operation of the apparatus of the fifth exemplary embodiment.

The operation of the present exemplary embodiment is now described with reference to a flowchart of FIG. 17.

Initially, the motion estimating means 51 references input low resolution images to make motion estimation to output motion estimation vectors $u(\alpha,\beta)$ and $v(\alpha,\beta)$. The motion estimating means 51 outputs the values of the matching distances $S(\alpha,\beta)$ and the temporal distance $\Delta t(\beta)$ (step S51).

The motion estimation reliability evaluating means 52 then calculates the corresponding relationship evaluation values $p(\alpha,\beta)$, based on the motion estimation vectors $u(\alpha,\beta)$ and $v(\alpha,\beta)$, while calculating the analogy degree evaluation value $q(\alpha,\beta)$, based on the values of the matching distances $S(\alpha,\beta)$ (step S52).

The motion distance evaluating means 53 then calculates the motion distance evaluation value $r(\alpha,\beta)$, based upon the motion estimation vector $u(\alpha,\beta)$, while calculating the temporal distance evaluation value $s(\beta)$ based upon the temporal distance $\Delta t(\beta)$ (step S53).

The motion estimation evaluating means 54 then performs the calculations, indicated by the aforementioned equation (9), on the corresponding relationship evaluation values $p(\alpha,\beta)$, analogy degree evaluation value $q(\alpha,\beta)$, motion distance evaluation value $r(\alpha,\beta)$ and the temporal distance evaluation value $s(\beta)$, to calculate the motion estimation evaluation value $\rho(\alpha,n)$ (step S54).

The image synthesizing weight calculating means 55 then references the input low resolution images, motion estimation vector $u(\alpha,\beta)$, which stands for the result of the motion estimation, and the motion estimation evaluation value $\rho(\alpha,n)$, to calculate the image synthesizing weight $\omega$ used for synthesizing the estimated high resolution image and the enlarged basis image (step S55).

The weighting matrix calculating means 56 then references the motion estimation evaluation value $\rho(\alpha,n)$ to calculate the weighting matrices $W_n$ (step S56).

The high resolution image estimating means 57 then references the input low resolution images, and the motion estimation vector $u(\alpha,\beta)$, which stands for the result of the motion estimation, to estimate the high resolution image which will minimize the aforementioned equation (3) or (4) (step S57).

The basis image enlarging means 58 then references the basis image Nb, among the input low resolution images, which is to be increased in resolution, to calculate an enlarged basis image which is an enlarged version of the basis image Nb (step S58).

Finally, the high resolution image synthesizing means 59 references the estimated high resolution image, as estimated by the high resolution image estimating means 57, the enlarged basis image, as enlarged by the basis image enlarging means 58, and the image synthesizing weight $\omega$, as calculated by the image synthesizing weight calculating means 55, to calculate an output high resolution image (step S59).

[Meritorious Effect of the Fifth Exemplary Embodiment]

With the present exemplary embodiment, it is possible to obtain a meritorious effect similar to that of the first exemplary embodiment.

Sixth Exemplary Embodiment

A sixth exemplary embodiment of the present invention is now described.

Figure 18:
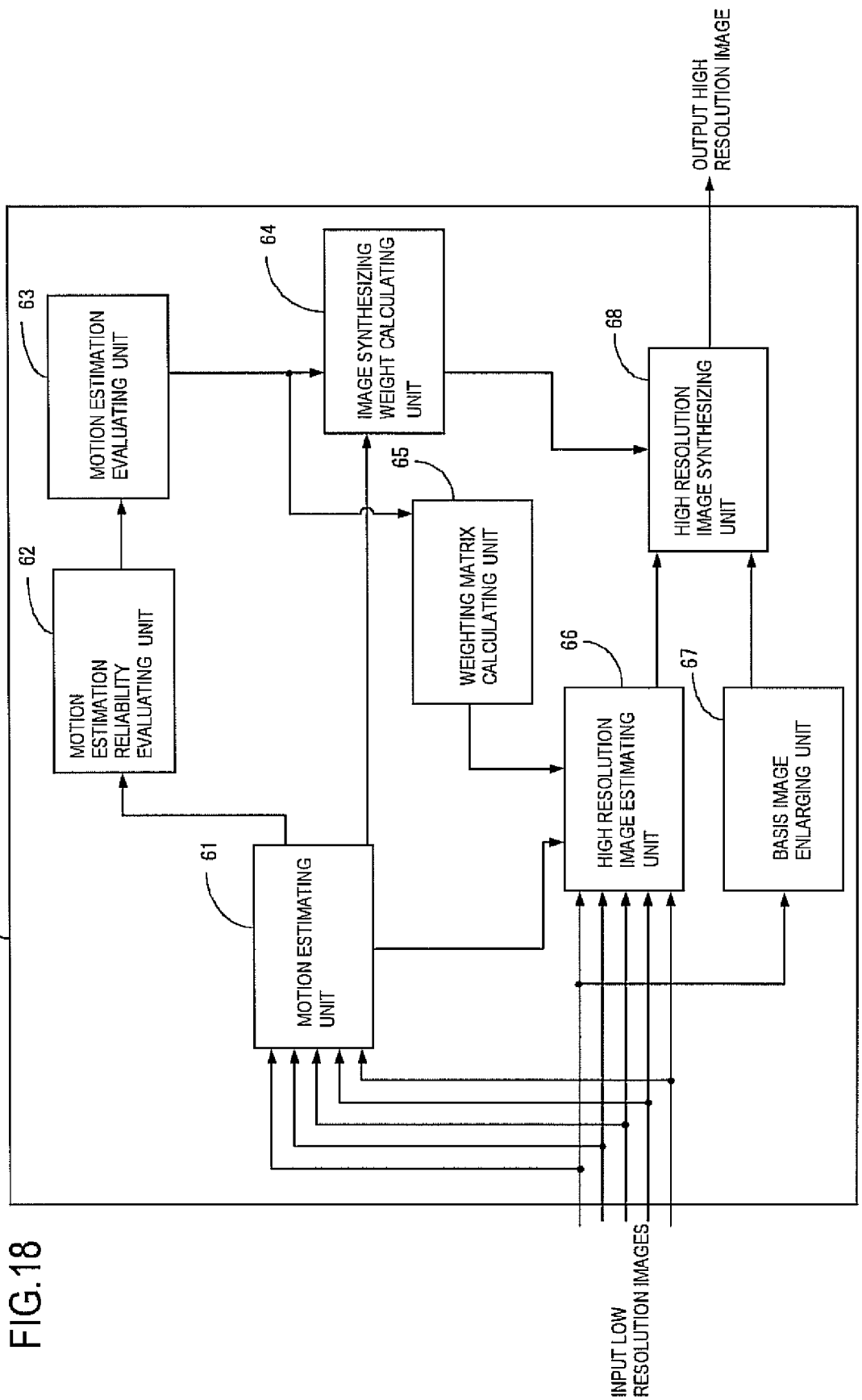
FIG. 18 is a block diagram showing a formulation of an image resolution enhancement apparatus according to a sixth exemplary embodiment of the present invention.

FIG. 18 depicts a block diagram showing an example of formulation of an image resolution enhancement apparatus 1e according to a sixth embodiment of the present invention. The image resolution enhancement apparatus 1e, shown in FIG. 18, includes a motion estimating means 61, a motion estimation reliability evaluating means 62, a motion estimation evaluating means 63, an image synthesizing weight calculating means 64, a weighting matrix calculating means 65, a high resolution image estimating means 66, a basis image enlarging means 67 and a high resolution image synthesizing means 68.

Similarly to the motion estimating means 21 of the second exemplary embodiment, the motion estimating means 61 receives low resolution images, as input, and outputs motion estimation vectors $u(\alpha,\beta)$ and $v(\alpha,\beta)$, as a result of the motion estimation between the reference images and the basis image. The motion estimating means also outputs the values of the matching distances $S(\alpha,\beta)$.

Similarly to the motion estimation reliability evaluating means 12 of the first exemplary embodiment, the motion estimation reliability evaluating means 62 includes a corresponding relationship evaluating means, not shown, and an analogy evaluating means, also not shown, and outputs corresponding relationship evaluation values $p(\alpha,\beta)$ and analogy degree evaluation values $q(\alpha,\beta)$.

Similarly to the motion estimation evaluating means 23 of the second exemplary embodiment, the motion estimation evaluating means performs calculations, indicated by the aforementioned equation (12), on the corresponding relationship evaluation values $p(\alpha,\beta)$ and the analogy degree evaluation value $q(\alpha,\beta)$, to calculate the motion estimation evaluation value $\rho(\alpha,n)$.

Similarly to the image synthesizing weight calculating means 35 of the third exemplary embodiment, the image synthesizing weight calculating means 64 references the motion estimation vector $u(\alpha,\beta)$, which stands for the result of the motion estimation, and the motion estimation evaluation value $\rho(\alpha,n)$, to calculate the weights ω of the respective pixels used for synthesizing the estimated high resolution image and the enlarged basis image.

Similarly to the weighting matrix calculating means 15 of the first exemplary embodiment, the weighting matrix calculating means 65 receives the motion estimation evaluation value $\rho(\alpha,n)$, as input, to calculate the weighting matrices $W_n$.

Similarly to the high resolution image estimating means 57 of the fifth exemplary embodiment, the high resolution image estimating means 66 references the low resolution images, the motion estimation vector $u(\alpha,\beta)$, which stands for the result of the motion estimation, and the weighting matrices $W_n$, to estimate the high resolution image $x_3$ which will minimize the equation (10) or (11).

Similarly to the basis image enlarging means 37 of the third exemplary embodiment, the basis image enlarging means 67 enlarges the basis image Nb, among the input low resolution images, which has to be enhanced in resolution, by a routine interpolation technique, such as Bi-Cubic method, to calculate the high resolution image $x_2$.

Similarly to the high resolution image synthesizing means 59 of the fifth exemplary embodiment, the high resolution image synthesizing means 68 references the high resolution image $x_3$, as estimated by the high resolution image estimating means 66, the high resolution image $x_2$, as calculated by the basis image enlarging means 67, and the image synthesizing weight ω, as calculated by the image synthesizing weight calculating means 64, to calculate an output high resolution image x.

It should be noted that, similarly to the other image resolution enhancement apparatus 1 and 1a to 1d, the image resolution enhancement apparatus 1e of the present exemplary embodiment may be implemented by a computer.

[Explanation of the Operation of Sixth Embodiment]

Figure 19:
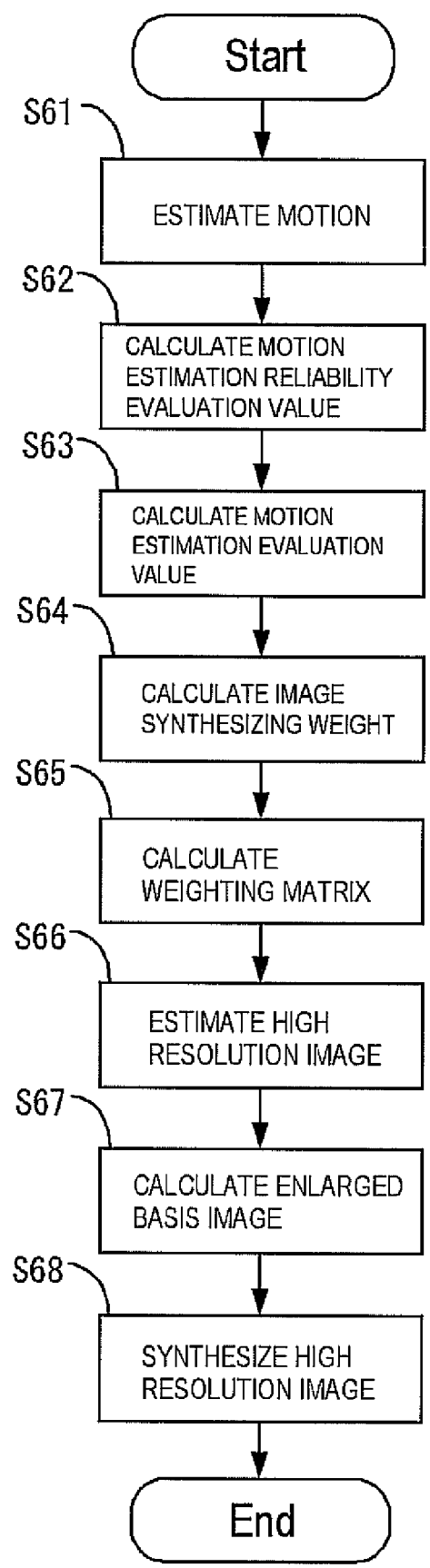
FIG. 19 is a flowchart for illustrating an example of operation of the apparatus of the sixth exemplary embodiment.
Figure 20B:
FIGS. 20A and 20B are photos for illustrating a meritorious effect of the present invention.
Figure 20A:
Figure 21:
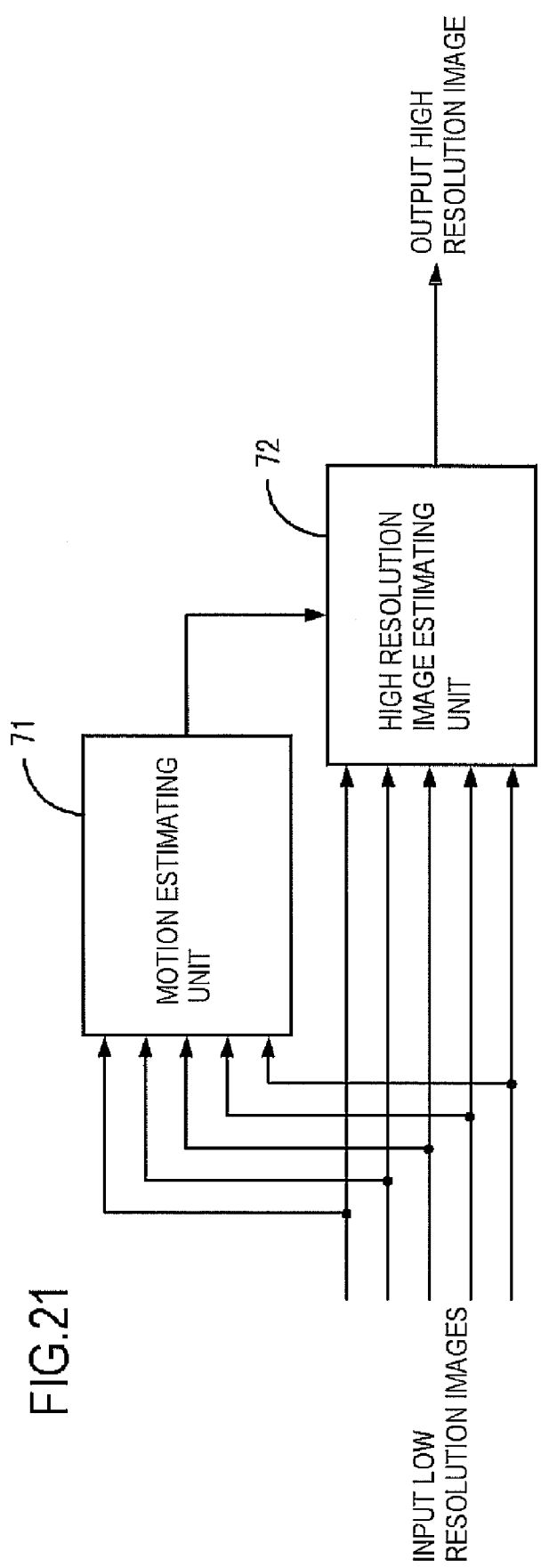
FIG. 21 is a block diagram for illustrating an example of the formulation of a conventional technique.

The operation of the present exemplary embodiment is now described with reference to the flowchart of FIG. 19.

Initially, the motion estimating means 61 references the input low resolution images to make motion estimation to output the motion estimation vectors $u(\alpha,\beta)$ and $v(\alpha,\beta)$ as the result of the motion estimation. The motion estimating means 61 also outputs the values of the matching distances $S(\alpha,\beta)$ (step S61).

The motion estimation reliability evaluating means 62 then references the motion estimation vectors $u(\alpha,\beta)$ and $v(\alpha,\beta)$, and the values of the matching distances $S(\alpha,\beta)$, to calculate the corresponding relationship evaluation values $p(\alpha,\beta)$ and the analogy degree evaluation value $q(\alpha,\beta)$ (step S62).

The motion estimation evaluating means 63 then performs calculations, shown by the equation (12), on the corresponding relationship evaluation values $p(\alpha,\beta)$ and the analogy degree evaluation values $q(\alpha,\beta)$, to calculate the motion estimation evaluation values $\rho(\alpha,n)$ (step S63).

The image synthesizing weight calculating means 64 then references motion estimation vector $u(\alpha,\beta)$, which stand for the result of motion estimation, and the motion estimation evaluation values $\rho(\alpha,n)$, to calculate the image synthesizing weight ω that may be used for synthesizing the estimated high resolution image and the enlarged basis image (step S64).

The weighting matrix calculating means 65 then references the motion estimation evaluation value $\rho(\alpha,n)$ to calculate the weighting matrix $W_n$ (step S65).

The high resolution image estimating means 66 then references the input low resolution images and the motion estimation vector $u(\alpha,\beta)$, which stands for the result of the motion estimation, to estimate the high resolution image which will minimize the aforementioned equation (3) or (4) (step S66).

The basis image enlarging means 67 then references the basis image Nb, among the input low resolution images, which is to be enhanced in resolution, to calculate an enlarged basis image, which is an enlarged version of the basis image Nb (step S67).

Finally, the high resolution image synthesizing means 68 references the estimated high resolution image, which is the image estimated by the high resolution image estimating means 66, the enlarged basis image, as calculated by the basis image enlarging means 67, and the image synthesizing weight ω, as calculated by the image synthesizing weight calculating means 64, to calculate the output high resolution image (step S68).

[Meritorious Effect of the Sixth Exemplary Embodiment]

With the present exemplary embodiment, it is possible to achieve the meritorious effect similar to that achieved with the second exemplary embodiment.

Although the preferred exemplary embodiments of the present invention have so far been described, the present invention is not limited to those embodiments and may include various other additions, changes or adjustments. Further changes or modifications may also be made within the gamut of the entire disclosure of the invention, inclusive of claims, based on its fundamental technical concept. A large variety of combinations or selections of variable disclosed elements may also be attempted within the scope of the present invention as defined by the claims.

INDUSTRIAL UTILIZABILITY

The present invention may be applied to an image resolution enhancement apparatus configured for generating a high resolution image from a plurality of low resolution images. Since the input image may not only be a still image, but also a plurality of frames in moving pictures, the present invention may be applied to an entire gamut of various video equipment.

The preferred modes are summarized as follows:

In the program, the high resolution mage estimating unit may estimate the high resolution image so that a pixel(s) of low reliability gives only weak or no affection. (Mode P1)

In the program, the high resolution image estimating unit may estimate the high resolution image so that a pixel(s) of high reliability gives strong affection. (Mode P2)

In the program, in carrying out calculations on the analogy degree, weighting values may be used conforming to the motion estimation reliability evaluation value output from the motion estimation reliability evaluating unit. (Mode P3)

In the program, the motion estimating unit may estimate, in a combination of given two of the low resolution images, a motion of a pixel of interest of one of the two low resolution images towards the other low resolution image to output an estimated motion as a first result of estimation; the motion estimating unit also estimating a motion of a pixel in the other low resolution image corresponding to the pixel of interest towards the one low resolution image to output an estimated motion as a second result of estimation;

wherein the motion estimation reliability evaluating unit may include:

a corresponding relationship evaluating unit for calculating a motion estimation reliability evaluation value with respect to the first result of estimation based on the relationship of correspondence between the first result of motion estimation and the second result of motion estimation. (Mode P4)

In the program, the first result of estimation and the second result of estimation may be motion estimation vectors; and the corresponding relationship evaluating unit may calculate the motion estimation reliability evaluation value conforming to a magnitude of a sum vector of a motion estimation vector corresponding to the first result of estimation and a motion estimation vector corresponding to the second result of estimation. (Mode P5)

In the program, the motion estimation reliability evaluating unit may include:

an analogy degree evaluating unit that calculates the motion estimation reliability evaluation value with respect to a result of motion estimation of the one pixel as estimated by the motion estimating unit based on a degree of analogy in luminance between the one pixel and another pixel corresponding to the one pixel. (Mode P6)

In the program, the computer may be caused to operate as a motion distance evaluating unit that calculates a motion distance evaluation value conforming to an amount of motion of the pixel(s) estimated by the motion estimating unit;

wherein the high resolution image estimating unit, in carrying out calculations on the analogy degree of the set of input low resolution images relative to the set of input low resolution images estimated from the high resolution image, may synthesize employing weighting conforming to the motion estimation reliability evaluation value output from the motion estimation reliability evaluating unit and to the motion distance evaluation value calculated by the motion distance evaluating unit. (Mode P7)

In the program, the computer may be caused to operate as temporal distance evaluating unit that calculates a temporal distance evaluating value conforming to a difference between time points of capturing the low resolution images;

wherein the high resolution image estimating unit, in carrying out calculations on the analogy degree, may employ weighting conforming to the motion estimation reliability evaluation value output from the motion estimation reliability evaluating unit and to the temporal distance evaluation value calculated by the temporal distance evaluating unit. (Mode P8)

There is provided a method for enhancement of image resolution in which a plurality of low resolution images may be synthesized to generate a high resolution image, comprising:

calculating motion of images between a plurality of low resolution images;

evaluating analogy degree between the plurality of low resolution images by compensating the motion of images; and generating a high resolution image of lower resolution in case the analogy degree is low. (Mode M1)

Further, there is provided a method for enhancement of image resolution in which a plurality of low resolution images may be synthesized to generate a high resolution image, comprising:

calculating motion of a first image from a first one of the low resolution images towards a second one of the low resolution images;

calculating motion of a second image from the second low resolution image towards the first low resolution image;

evaluating analogy degree of the plurality of low resolution images by compensating motion of the images; and generating a high resolution image of lower resolution in case of low symmetry of the motion of the first image and the motion of the second image. (Mode M2)

The invention claimed is:

1. An apparatus for enhancement of image resolution in which a plurality of low resolution images are received as a set of input low resolution images, which is synthesized to generate a high resolution image, to be output bearing a highest degree of analogy of said set of input low resolution images relative to a set of low resolution images estimated from the high resolution image; said apparatus comprising:

a motion estimating unit that estimates motion between pixels of low resolution images to output result of motion estimation;

a motion estimation reliability evaluating unit that evaluates reliability of the result of the motion estimation as output by said motion estimating unit and that outputs a motion estimation reliability evaluation value indicating a reliability degree; and a high resolution image estimating unit that estimates a high resolution image to be output by employing an analogy degree calculating method, in performing calculations of said analogy degree, said analogy degree calculation method being in conformity with said motion estimation reliability evaluation value output from said motion estimation reliability evaluating unit wherein:

said high resolution image to be output minimizes a sum total of multiplication values calculated by multiplying difference values and corresponding weights based on said reliability of the result of the motion estimation, each difference value being a difference between an input low resolution image and a corresponding image generated using transformation matrix including motion vector and down-sampling.

2. The apparatus for enhancement of image resolution according to claim 1 wherein said high resolution image estimating unit estimates said high resolution image so that a pixel(s) of low reliability gives only weak or no affection.

3. The apparatus for enhancement of image resolution according to claim 1 wherein said high resolution image estimating unit estimates said high resolution image so that a pixel(s) of high reliability gives strong affection.

4. The apparatus for enhancement of image resolution according to claim 1, wherein, in carrying out calculations for said analogy degree, said high resolution image estimating unit uses weighting values conforming to the motion estimation reliability evaluation value output from said motion estimation reliability evaluating unit.

5. The apparatus for enhancement of image resolution according to claim 1, wherein said motion estimating unit estimates, in a combination of given two of said low resolution images, the motion of a pixel(s) of interest of one of said two low resolution images towards the other low resolution image to output the estimated motion as being a first result of estimation; said motion estimating unit also estimating the motion of a pixel(s) of said other low resolution image corresponding to said pixel of interest towards said one low resolution image to output the estimated motion as being a second result of estimation;

said motion estimation reliability evaluating unit including:

a corresponding relationship evaluating unit that calculates a motion estimation reliability evaluation value with respect to said first result of estimation based on the relationship of correspondence between said first result of estimation and said second result of estimation.

6. The apparatus for enhancement of image resolution according to claim 5, wherein said first result of estimation and said second result of estimation are motion estimation vectors; and said corresponding relationship evaluating unit calculates the motion estimation reliability evaluation value conforming to a magnitude of a sum vector of a motion estimation vector corresponding to said first result of motion estimation and a motion estimation vector corresponding to said second result of estimation.

7. The apparatus for enhancement of image resolution according to claim 1, wherein said motion estimation reliability evaluating unit includes:

an analogy degree evaluating unit that calculates said motion estimation reliability evaluation value with respect to a motion of a given one of said pixels as estimated by said motion estimating unit based on a degree of analogy in luminance between said one pixel and another pixel corresponding to said one pixel.

8. The apparatus for enhancement of image resolution according to claim 1, further comprising:

a motion distance evaluating unit that calculates a motion distance evaluation value conforming to an amount of motion of said given one of said pixels as estimated by said motion estimating unit;

said high resolution image estimating unit, in carrying out calculations for said analogy degree, uses weighting conforming to the motion estimation reliability evaluation value output from said motion estimation reliability evaluation unit and to said motion distance evaluation value calculated by said motion distance evaluating unit.

9. The apparatus for enhancement of image resolution according to claim 1, further comprising:

a temporal distance evaluating unit that calculates a temporal distance evaluating value conforming to a difference between time points of capturing said low resolution images;

said high resolution image estimating unit, in carrying out calculations for said analogy degree, uses weighting conforming to the motion estimation reliability evaluation value output from said motion estimation reliability evaluating unit and to the temporal distance evaluation value calculated by said temporal distance evaluating unit.

10. A method for enhancement of image resolution in which motion of respective pixels between a plurality of input low resolution images is estimated, and results of motion estimation are used to output a high resolution image having a highest analogy degree of a set of input low resolution images relative to a set of low resolution images estimated from the high resolution image generated; wherein a method for calculations for the analogy degree is changed based on reliability of said results of motion estimation wherein:

the generated high resolution image minimizes a sum total of multiplication values calculated by multiplying difference values and corresponding weights based on the reliability of the results of the motion estimation, each difference value being a difference between an input low resolution image and a corresponding image generated using transformation matrix including motion vector and down-sampling.

11. The method according to claim 10, wherein said method comprises:

estimating motion between pixels of the low resolution images to output results of motion estimation;

evaluating reliability of the results of the motion estimation and outputting a motion estimation reliability evaluation value indicating reliability degree; and estimating a high resolution image by employing, in calculating said analogy degree, a method for calculating the analogy degree conforming to motion estimation reliability evaluation value output in said motion estimation reliability evaluation.

12. The method for enhancement of image resolution according to claim 11, wherein in said high resolution image estimating, a high resolution image is estimated so that a pixel(s) of low reliability gives only weak or no affection.

13. The method for enhancement of image resolution according to claim 11, wherein in said high resolution image estimating, a high resolution image is estimated so that a pixel(s) of high reliability gives strong affection.

14. The method for enhancement of image resolution according to claim 11, wherein in said high resolution image estimating, in carrying out calculations of said analogy degree, weighting value is used which is in conformity with a motion estimation reliability evaluation value output from said motion estimation reliability estimation.

15. The method for enhancement of image resolution according to claim 11, wherein in said motion estimation, as for a combination of given two of said low resolution images, a motion of a pixel of interest on one of said two low resolution images towards the other low resolution image is estimated to output an estimated motion as a first result of estimation; also a motion of a pixel on the other low resolution image corresponding to said pixel of interest towards said one of said two low resolution images being estimated to output an estimated motion as a second result of estimation;

in said motion estimation reliability evaluation, a motion estimation reliability evaluation value with respect to said first result of estimation is calculated based on a relationship of correspondence between said first result of estimation and said second result of estimation.

16. The method for enhancement of image resolution according to claim 12, wherein said first result of estimation and said second result of estimation are motion estimation vectors; and in said motion estimation reliability evaluation, a motion estimation reliability evaluation value is calculated conforming to a magnitude of a sum vector of the motion estimation vector corresponding to said first result of estimation and a motion estimation vector corresponding to said second result of estimation.

17. The method for enhancement of image resolution according to claim 11, wherein in said motion estimation reliability evaluation, a motion estimation reliability evaluation value with respect to a result of motion estimation as estimated by said motion estimation is calculated based on degree of analogy in luminance between said one pixel and another pixel corresponding to said one pixel.

18. The method for enhancement of image resolution according to claim 11, further comprising:

motion distance evaluating by calculating a motion distance evaluation value conforming to an amount of motion of said given one of said pixels as estimated by said motion estimation;

wherein in said high resolution image estimating, in carrying out calculations for the analogy degree of said set of input low resolution images relative to a set of input low resolution images as estimated from the high resolution image, weighting is used conforming to the motion estimation reliability evaluation value output in said motion estimation reliability evaluation and to said motion distance evaluation value calculated in said motion distance evaluation.

19. The method for enhancement of image resolution according to claim 11, further comprising:

temporal distance evaluating by calculating a temporal distance evaluating value conforming to a difference between time points of capturing said low resolution images;

wherein in said high resolution image estimating, in carrying out calculations for the analogy degree of said set of input low resolution images relative to a set of low resolution images as estimated from the high resolution image, weighting is used conforming to the motion estimation reliability evaluation value output from said motion estimation reliability evaluating and to the temporal distance evaluation value calculated by said temporal distance evaluating.

20. A computer readable storage device encoded with a computer program for allowing a computer to operate as an apparatus for enhancement of image resolution adapted for outputting a high resolution image bearing a highest analogy degree of a set of input low resolution images relative to a set of low resolution images estimated from the high resolution image generated; wherein said computer is configured for operating as:

a motion estimating unit that estimates motion(s) between pixels of the low resolution images to output a result(s) of the motion estimation;

a motion estimation reliability evaluating unit that evaluates a reliability of the result(s) of the motion estimation as output by said motion estimating unit and that outputs a motion estimation reliability evaluation value indicating a reliability degree; and a high resolution image estimating unit that estimates a high resolution image, in which in carrying out calculations on the analogy degree of said set of input low resolution images relative to a set of low resolution images estimated from the high resolution image, a method is employed which is in conformity with the motion estimation reliability evaluation value output by said motion estimation reliability evaluating unit, wherein:

said high resolution image to be output minimizes a sum total of multiplication values calculated by multiplying difference values and corresponding weights based on said reliability of the result of the motion estimation, each difference value being a difference between an input low resolution image and a corresponding image generated using transformation matrix including motion vector and down-sampling.

* * * * *